(12) United States Patent
Sugimoto

(10) Patent No.: US 7,646,415 B2
(45) Date of Patent: Jan. 12, 2010

(54) IMAGE CORRECTION APPARATUS CORRECTING AND DISPLAYING CORRECTED AREA AND METHOD OF CONTROLLING SAME

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 431 days.

(21) Appl. No.: 11/248,273

(22) Filed: Oct. 13, 2005

(65) Prior Publication Data
US 2006/0082847 A1    Apr. 20, 2006

(30) Foreign Application Priority Data
Oct. 14, 2004    (JP) .............................. 2004-299479

(51) Int. Cl.
H04N 5/222 (2006.01)
H04N 9/73 (2006.01)
G03B 15/03 (2006.01)

(52) U.S. Cl. .............................. 348/333.02; 348/223.1; 396/158

(58) Field of Classification Search ................. 348/239, 348/333.02, 333.03, 241, 223.1, 225.1; 396/158; 382/167
See application file for complete search history.

(56) References Cited

U.S. PATENT DOCUMENTS

| | | | | |
|---|---|---|---|---|
| 5,990,973 | A * | 11/1999 | Sakamoto | 348/576 |
| 6,470,151 | B1 | 10/2002 | Ohsawa | |
| 6,577,751 | B2 * | 6/2003 | Yamamoto | 382/117 |
| 6,738,510 | B2 | 5/2004 | Tsuruoka et al. | |
| 7,024,035 | B1 * | 4/2006 | Enomoto | 382/167 |
| 7,035,462 | B2 * | 4/2006 | White et al. | 382/167 |
| 7,174,034 | B2 * | 2/2007 | O'Callaghan | 382/117 |
| 2001/0016064 | A1 | 8/2001 | Tsuruoka et al. | |
| 2004/0041924 | A1 * | 3/2004 | White et al. | 348/239 |
| 2004/0114796 | A1 * | 6/2004 | Kaku | 382/165 |
| 2004/0119851 | A1 * | 6/2004 | Kaku | 348/239 |
| 2004/0233299 | A1 * | 11/2004 | Ioffe et al. | 348/239 |
| 2004/0233301 | A1 * | 11/2004 | Nakata et al. | 348/239 |
| 2005/0163498 | A1 * | 7/2005 | Battles et al. | 396/158 |
| 2005/0280717 | A1 * | 12/2005 | Sugimoto | 348/222.1 |
| 2006/0129950 | A1 * | 6/2006 | Zhao et al. | 715/810 |
| 2006/0274963 | A1 * | 12/2006 | Hibi | 382/275 |

FOREIGN PATENT DOCUMENTS

| | | |
|---|---|---|
| CN | 1506910 A | 6/2004 |
| CN | 1638443 A | 7/2005 |

(Continued)

OTHER PUBLICATIONS

Yin et al., Pattern Recognition, Jul. 2004, pp. 1407-1422.

*Primary Examiner*—John M Villecco
(74) *Attorney, Agent, or Firm*—Birch, Stewart, Kolasch & Birch, LLP

(57) ABSTRACT

Whether the image of a subject contains a redeye-image area is detected. If the image contains a redeye-image area, this area is corrected. In order that a user can ascertain that a redeye-corrected image area has been corrected, a frame is displayed around this corrected image area. The fact that the image area within the frame has undergone the redeye-image correction can be ascertained owing to display of the frame. The user can ascertain which area in the image of the subject has been subjected to redeye-image correction processing.

16 Claims, 18 Drawing Sheets

FOREIGN PATENT DOCUMENTS

| | | |
|---|---|---|
| JP | 7-287312 A | 10/1995 |
| JP | 2000-305141 A | 11/2000 |
| JP | 2001-333372 A | 11/2001 |
| JP | 2003-281562 A | 10/2003 |
| JP | 2004-72685 A | 3/2004 |
| JP | 2004-80549 A | 3/2004 |
| JP | 2004-96439 A | 3/2004 |
| JP | 2004-208281 A | 7/2004 |

* cited by examiner

IMAGE CORRECTION APPARATUS CORRECTING AND DISPLAYING CORRECTED AREA AND METHOD OF CONTROLLING SAME

BACKGROUND OF THE INVENTION

1. Field of the Invention

This invention relates to an image correction apparatus and to a method of controlling the same.

2. Description of the Related Art

When a flash photo is taken of a subject using a camera, there are instances where the so-called "redeye" phenomenon occurs. Although there are occasions where redeye can be prevented as by preliminary flash, there are also occasions where redeye cannot be prevented.

For this reason, an example of the prior art proposes to determine whether the image of a subject obtained by flash photography contains an area that is a redeye image and to indicate the redeye-image area with an arrow mark if this area is contained in the image (see the specification of Japanese Patent Application Laid-Open No. 2000-305141).

However, as the user must apply a redeye-image correction command to the apparatus upon checking the area that is the redeye image, this approach is comparatively troublesome. It has been contemplated, therefore, to display the image of a subject that has already been corrected for a redeye image. However, there are occasions where the user cannot tell which area has been corrected. This is not limited to correction of a redeye image but also holds true with regard to other corrections as well.

SUMMARY OF THE INVENTION

Accordingly, an object of the present invention is to so arrange it that a user can determine which area of an image has been corrected.

According to a first aspect of the present invention, the foregoing object is attained by providing an image correction apparatus comprising: a correction target area detection device for detecting a correction target area in the image of a subject; a correction device for applying at least one correction of a color correction and brightness correction to the correction target area detected by the correction target area detection device; and a first display control device for controlling a display device in such a manner that the image of the subject in which the correction target area has been corrected by the correction device will be displayed on a display screen with the corrected area pointed out explicitly.

The first aspect of the present invention also provides a control method suited to the above-described image correction apparatus. Specifically, the method comprises the steps of: detecting a correction target area in the image of a subject; applying at least one correction of a color correction and brightness correction to the detected correction target area; and controlling a display device in such a manner that the image of the subject in which the correction target area has been corrected will be displayed on a display screen with the corrected area pointed out explicitly.

In accordance with the first aspect of the present invention, an area to undergo a correction is detected in the image of a subject, and the detected area is subjected to at least one correction of a color correction and brightness correction. The image of the subject in which the corrected area is pointed out explicitly is displayed on the display screen of a display device.

Since the corrected image of the subject is displayed with the corrected area pointed out explicitly, the user can tell which area of the image has been corrected. If necessary, the corrected target area can be corrected further or restored to the image that prevailed before the correction was applied. Displaying the corrected area so that it is pointed out explicitly means displaying it in such a manner that it will be discernable in comparison with areas that have not been corrected. This may be achieved by surrounding the corrected area with a frame, indicating it with an arrow or causing it to flash. Further, the color correction refers to a change in tone, a change in brightness, a change in saturation, a change in hue or a change to a complementary color.

The correction target area is a redeye area, by way of example.

Further, the first display control device may control the display device in such a manner that the corrected area is pointed out explicitly and displayed on the display screen by at least one of marking and flashing that indicate the correction target area, or may control the display device in such a manner that the corrected area is pointed out explicitly and displayed on the display screen by at least one of a color correction, brightness correction, marking and flashing of non-correction target areas, which are areas other than the correction target area.

The apparatus may further comprise a first input device for inputting a pre-correction display command, and a second display control device for controlling the display device, in response to input of the pre-correction command from the first input device, in such a manner that the image of a subject that prevails prior to correction of the correction target area will be displayed on the display screen.

The apparatus may further comprise a second input device for inputting an explicit-display halt command. In this case, the first display control device would halt the explicit display in response to the halt command that has been input from the second input device.

According to a second aspect of the present invention, the foregoing object is attained by providing an image correction apparatus comprising: a correction target area detection device for detecting a correction target area in the image of a subject; a correction device for applying at least one correction of a color correction and brightness correction to the correction target area detected by the correction target area detection device; and a display control device for controlling a display device in such a manner that the image of the subject in which the correction target area has been corrected by the correction device and the image of the subject that prevailed before the correction will be displayed on the same display screen simultaneously.

The second aspect of the present invention also provides a control method suited to the above-described image correction apparatus. Specifically, the method comprises the steps of: detecting a correction target area in the image of a subject; applying at least one correction of a color correction and brightness correction to the detected correction target area; and controlling a display device in such a manner that the image of the subject in which the correction target area has been corrected and the image of the subject that prevailed before the correction will be displayed on the same display screen simultaneously.

In accordance with the second aspect of the present invention, an area to undergo a correction is detected in the image of a subject and the detected area is corrected. The corrected image of the subject and the image of the subject before the corrected are displayed on the same display screen. Since the images of the subject before and after the correction are displayed on the same display screen, conditions before and after the correction can be checked.

The correction target area is a redeye area, by way of example.

At least one of the image of the subject after the correction and the image of the subject before the correction displayed on the display screen is a portion of the image of the subject that contains the correction area.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the drawings.

Figure 1:
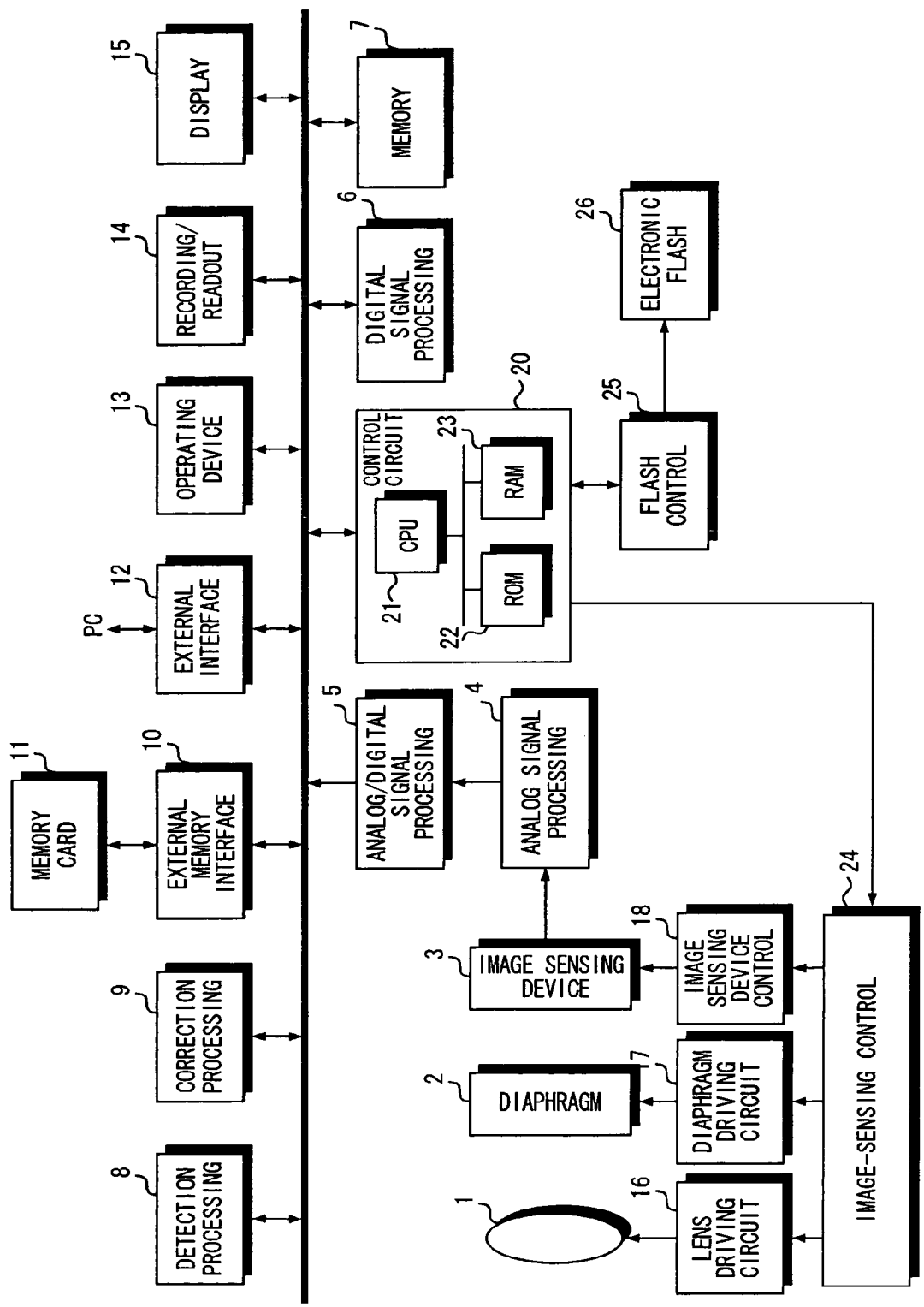
FIG. 1 is a block diagram illustrating the electrical structure of a digital still camera.
Figure 2:
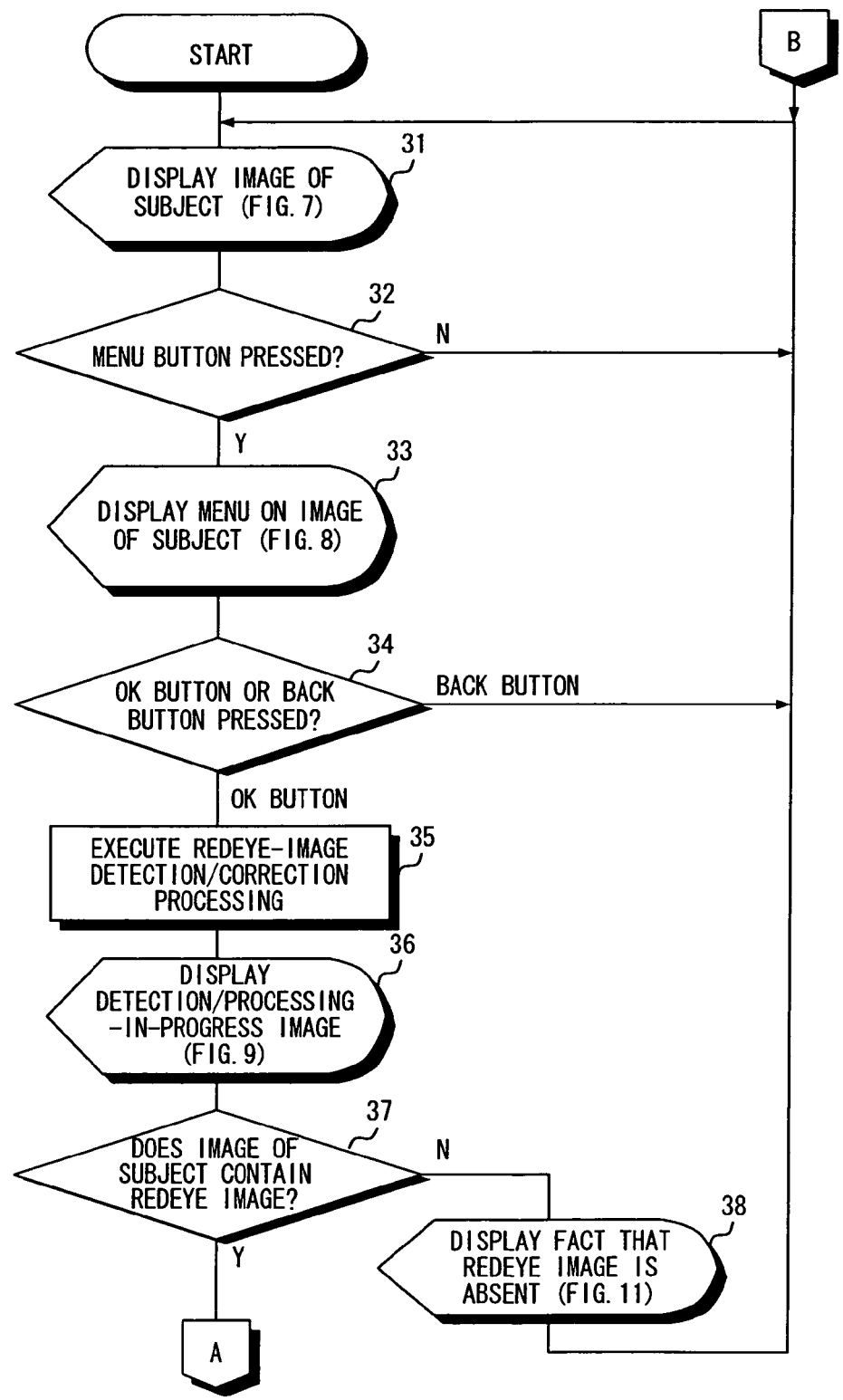
FIGS. 2 to 5 are flowcharts illustrating processing executed by the digital still camera.

FIG. 1 is a block diagram illustrating the electrical structure of a digital still camera according to a first embodiment of the present invention.

Redeye-image correction processing can be executed in the digital still camera according to this embodiment. In particular, in order that a user may ascertain which part of the image of a subject has been subjected to redeye-image correction processing in the digital still camera according to this embodiment, a frame is displayed on the area that has undergone the redeye-image correction processing. By observing the portion of the image within the frame, the user can confirm the fact that the redeye-image correction processing has been executed. Although redeye-image correction processing will be described in the processing set forth below, it goes without saying that the invention is applicable to other correction processing as well.

The overall operation of the digital still camera is controlled by a control circuit 20.

The control circuit 20 includes a CPU 21, a ROM 22 and a RAM 23 interconnected by a bus. The nature of processing (name of processing) of the image processing executed in the digital still camera, the version of the image processing, other necessary data and image processing programs, etc., have been stored in the ROM 22. The RAM 23 temporarily stores required data as well as image data, etc., that has been read out of a memory card 11.

The digital still camera includes an operating device 13 having buttons and a mode setting dial (which is capable of setting various modes such as an image sensing mode, a playback mode and a correction mode). The buttons include a shutter-release button; an up, down, left, right button having up, down, left, right arrows capable of being pressed; an OK button; a BACK button; a telephoto button; a wide-angle button; a before-correction button; an after-correction button; and a frame button. The before-correction button is a button pressed by the user when the image of a subject prevailing prior to correction of a redeye image is to be displayed, and the after-correction button is a button pressed by the user when the image of the subject after the correction of the redeye image is to be displayed. The frame button is a button pressed by the user to set display/non-display of a frame indicating an area that has been subjected to redeye-image correction processing. An operating signal, which indicates depression of a button, etc., that is output from the operating device 13 is input to the control circuit 20. Further, a personal computer is capable of being connected to the digital still camera, which is provided with an external interface 12 for this purpose.

The digital still camera includes an image sensing lens 1 for sensing the image of a subject, a diaphragm 2 and an image sensing device 3 such as a CCD. The lens position of the image sensing lens 1 is controlled by a lens driving circuit 16. The aperture of the diaphragm 2 is controlled by a diaphragm driving circuit 17. A light beam representing the image of a subject is condensed by the zoom lens 1 and impinges upon the image sensing device 3 such as the CCD through the diaphragm 2. A light image representing the image of the subject is formed on the photoreceptor surface of the image sensing device 3, which is controlled by a control circuit 18 for the image sensing device 3. The lens driving circuit 16, diaphragm driving circuit 17 and control circuit 18 are controlled by an image-sensing control circuit 24.

If the image sensing mode is set by the mode setting dial 20, the image sensing device 3 is controlled by a control circuit 18 and the image sensing device 3 outputs a video signal representing the image of the subject. The video signal is subjected to analog signal processing such as correlated double sampling in an analog signal processing circuit 4. The video signal that is output from the analog signal processing circuit 4 is converted to digital image data in an analog/digital signal processing circuit 5 and the digital image data is input to a digital signal processing circuit 6. Digital signal processing such as a gamma correction, automatic tone compensation and white balance adjustment is executed in the digital signal processing circuit 6.

The image data that has been output from the digital signal processing circuit 6 is applied to a display unit 15 via a memory 7. The image of the subject is displayed on the display screen of a display unit 15.

If the shutter-release button is pressed, the image of the subject is sensed again and image data representing the image of the subject is obtained in a manner similar to that described above. This image data is applied from the digital signal processing circuit 6 to the memory 7, where the image data is stored temporarily. The image data is read out of the memory 7 and recorded on the memory card 11, which is connected to an external memory interface 10, by a recording/readout control circuit 14. It goes without saying that the image data may be subjected to data compression as necessary and the compressed image data recorded on the memory card 11.

If a playback mode is set by the mode setting dial, image data representing the image of the subject is read out of the memory card 11 by the recording/readout control circuit 14. The image data that has been read out is applied to and stored temporarily in the memory 7. The image data is read out of the memory 7 and applied to the display unit 15. The image represented by the image data that has been recorded on the memory card 11 is displayed on the display screen of the display unit 15.

If a redeye-image correction menu is selected in the playback mode, a detection processing circuit 8 executes redeye-image detection processing for determining whether a redeye image is contained in the image of the subject, as will be described later. Further, if a redeye image has been detected, processing for correcting the redeye image is executed by a correction processing circuit 9. The image data that has been subjected to the redeye-image correction processing is applied to the display unit 15 and is displayed on the display screen thereof. Thus, the image of the subject that has undergone correction of the redeye image is displayed. If processing for correcting a redeye image has been executed, a frame surrounding the corrected image area is displayed. Thus the user can ascertain which area has been subjected to the redeye-image correction processing.

Figure 4:
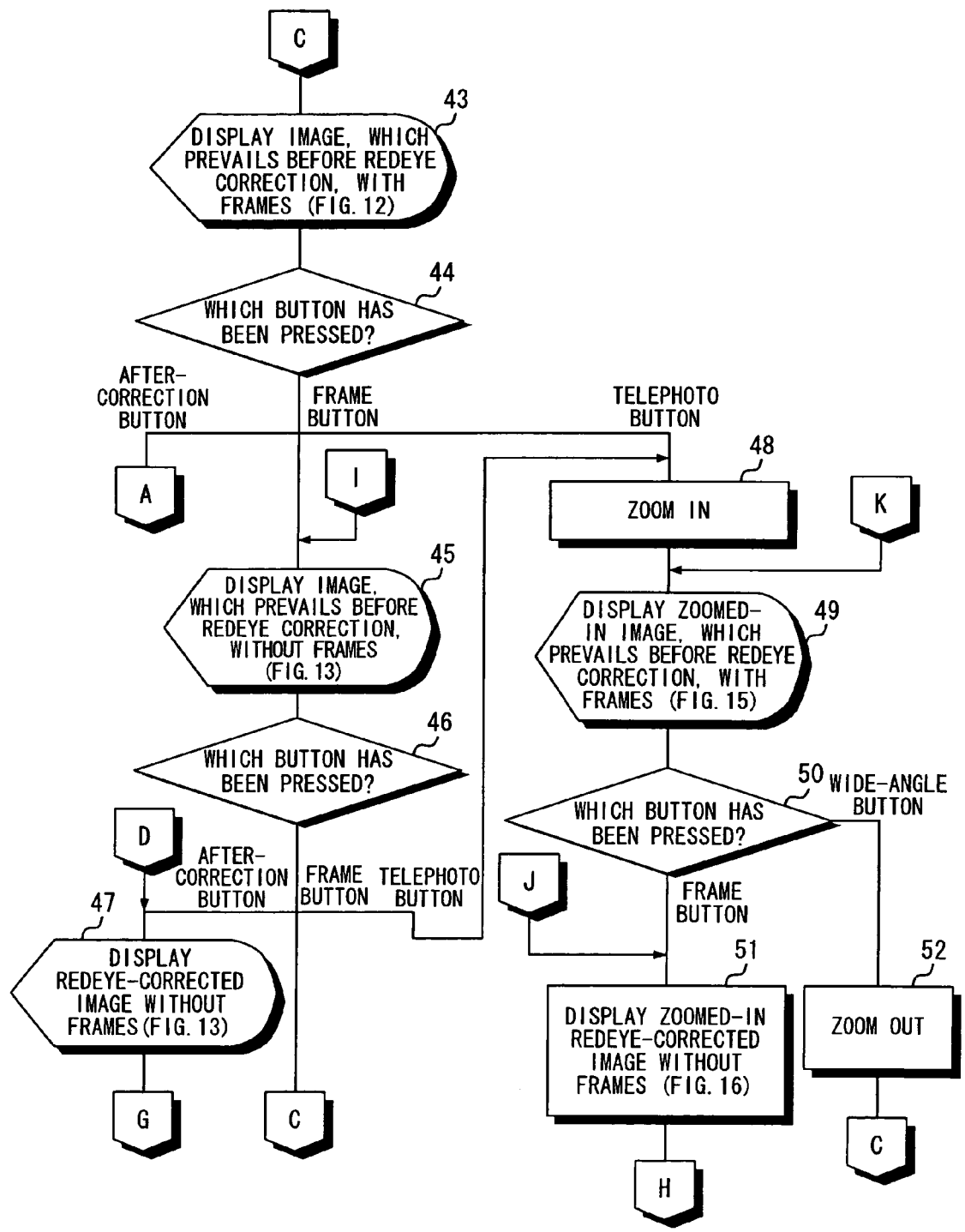
Figure 5:
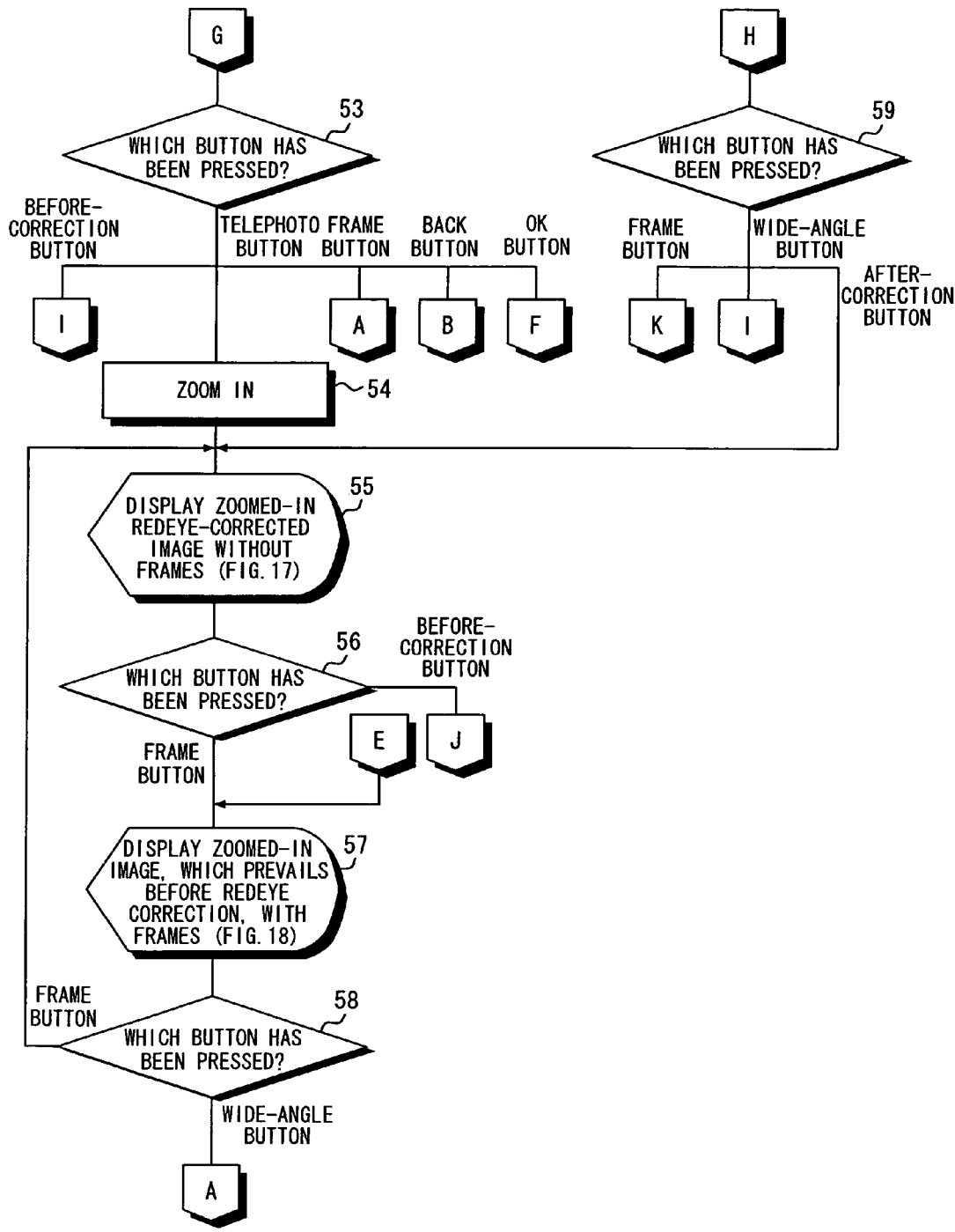
Figure 6:
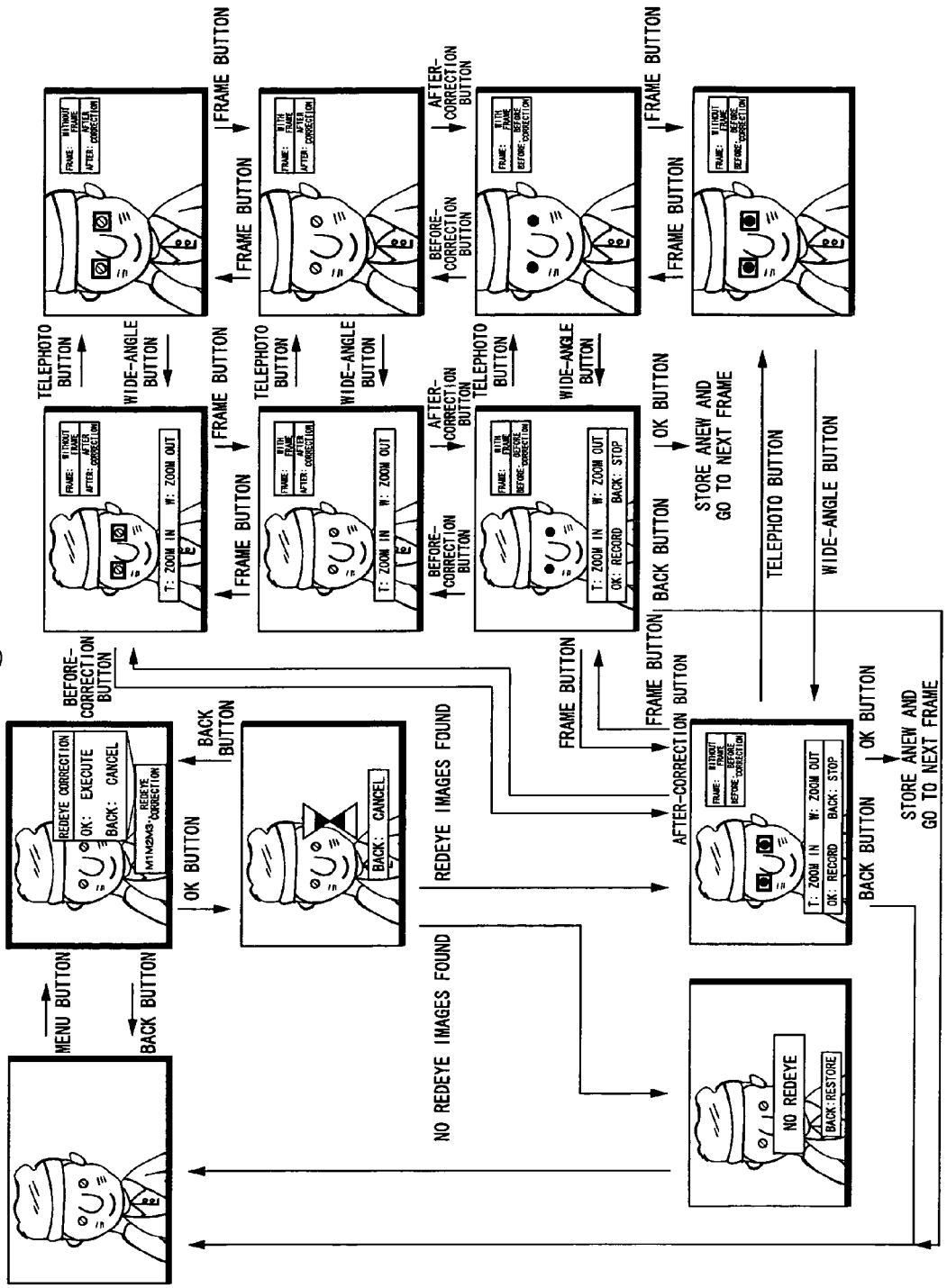
FIG. 6 illustrates the transition of the image of a subject displayed on a display screen.

FIGS. 2 to 5 are flowcharts illustrating processing executed by the digital still camera in the playback mode, FIG. 6 illustrates the transition of the image of a subject displayed on the display screen of the display unit 15 of the digital still camera, and FIGS. 7 to 18 illustrate examples of images of a subject displayed on the display screen of the display unit 15 of the digital still camera.

If the playback mode is set, image data that has been recorded on the memory card 11 is read out and the image represented by this image data is displayed on the display screen of the display unit 15 (step 31), as described above.

Figure 7:
FIGS. 7 to 18 illustrate examples of images of a subject displayed on a display screen.

As shown in FIG. 7, a subject image 71 represented by the image data that has been read out of the memory card 11 is displayed on a display screen 70 of the display unit 15. The subject image 71, which has been obtained as by flash photography, has developed the redeye phenomenon in the area of the eyes (redeye images 91). The fact that these areas are redeye images is indicated by hatching.

Figure 8:
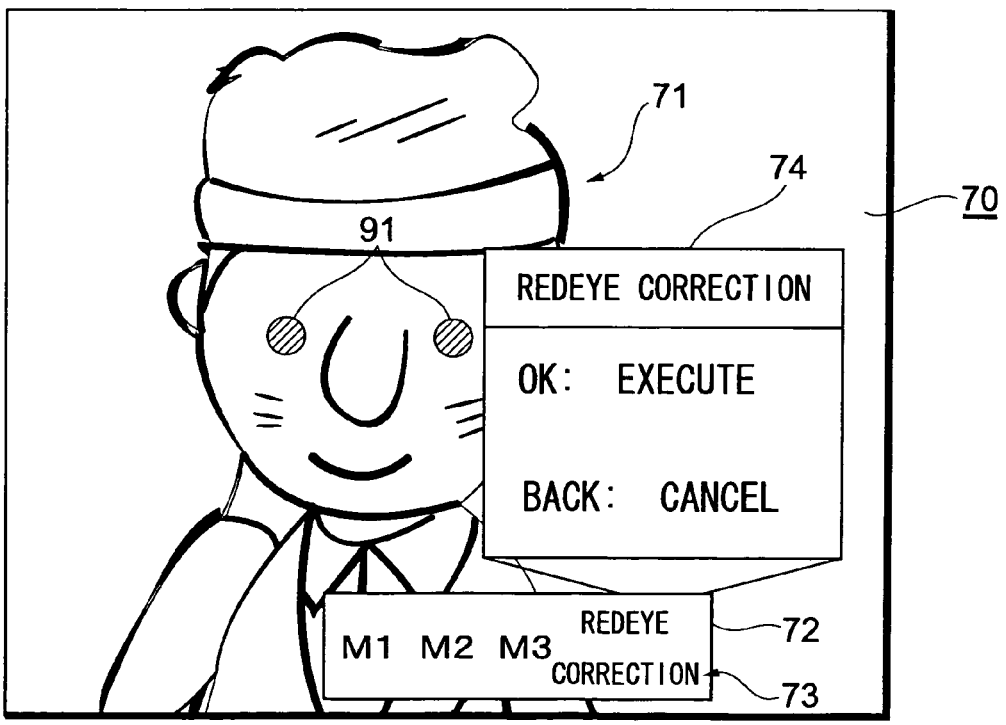

With reference again to FIG. 2, if the menu button on the digital still camera is pressed ("YES" at step 32), a menu 72 is displayed on the subject image 71 near the bottom of the display screen 70, as shown in FIG. 8 (step 33).

As shown in FIG. 8, the menu 72 includes various menu icons M1, M2 and M3. A redeye-correction menu icon 73 is contained in the menu 72. The redeye-correction menu icon 73 is selected using the up, down, left, right button on the digital still camera. In response, an operating window 74 indicating the method of the redeye correction appears on the display screen 70. The operating window 74 includes text to the effect that the OK button should be pressed to execute the redeye correction and that the BACK button should be pressed to cancel the redeye correction. The subject image 71 being displayed on the display screen 70 is subjected to the redeye correction by pressing the OK button, and the redeye correction is cancelled by pressing the BACK button.

Figure 9:
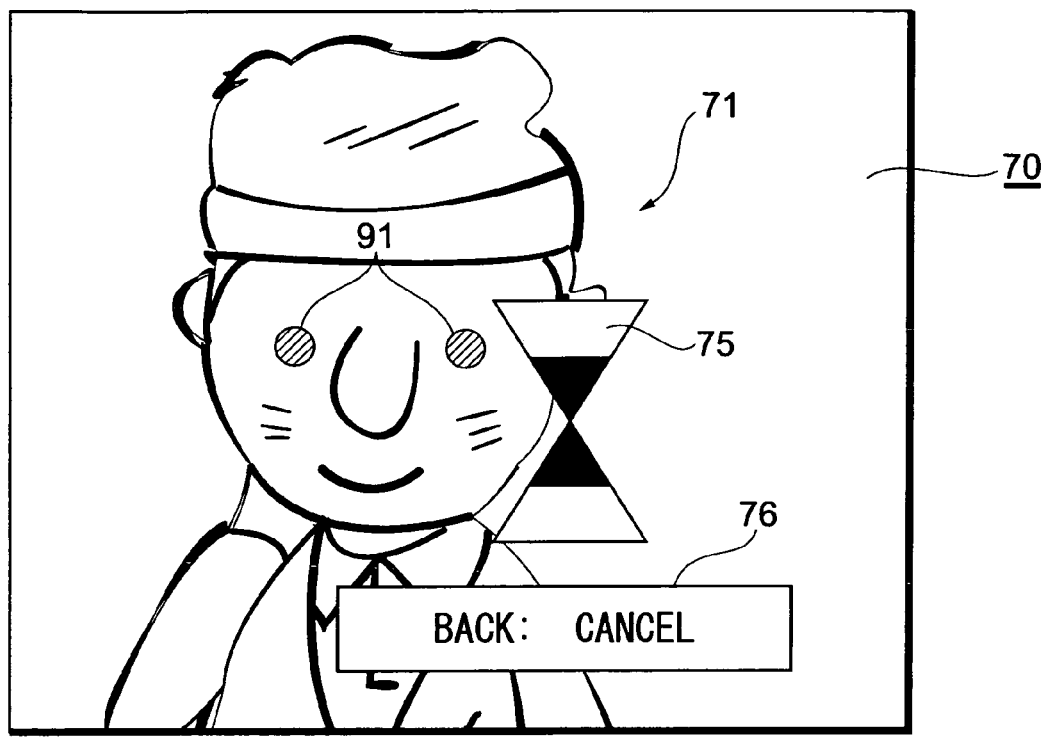

With reference again to FIG. 2, if the BACK button is pressed (step 34), the display of the menu 72 vanishes from the display screen 70 and the subject image 71 shown in FIG. 7 is displayed. If the OK button is pressed (step 34), redeye-image detection processing and correction processing is applied to the subject image 71 being displayed on the display screen 70 (step 35). During the time that redeye-image detection processing is being executed (during the time that redeye-image correction processing is being executed in a case where redeye-image correction processing is executed), a detection/processing-in-progress image in which an image 75 of a seconds clock appears is displayed, as shown in FIG. 9, substantially at the center of the display screen 70 in such a manner that the user can ascertain that processing is in progress (step 36). An operating window 76 also appears near the bottom of the display screen 70. The fact that redeye correction processing will be cancelled by pressing the BACK button is indicated in the operating window 76.

Figure 11:
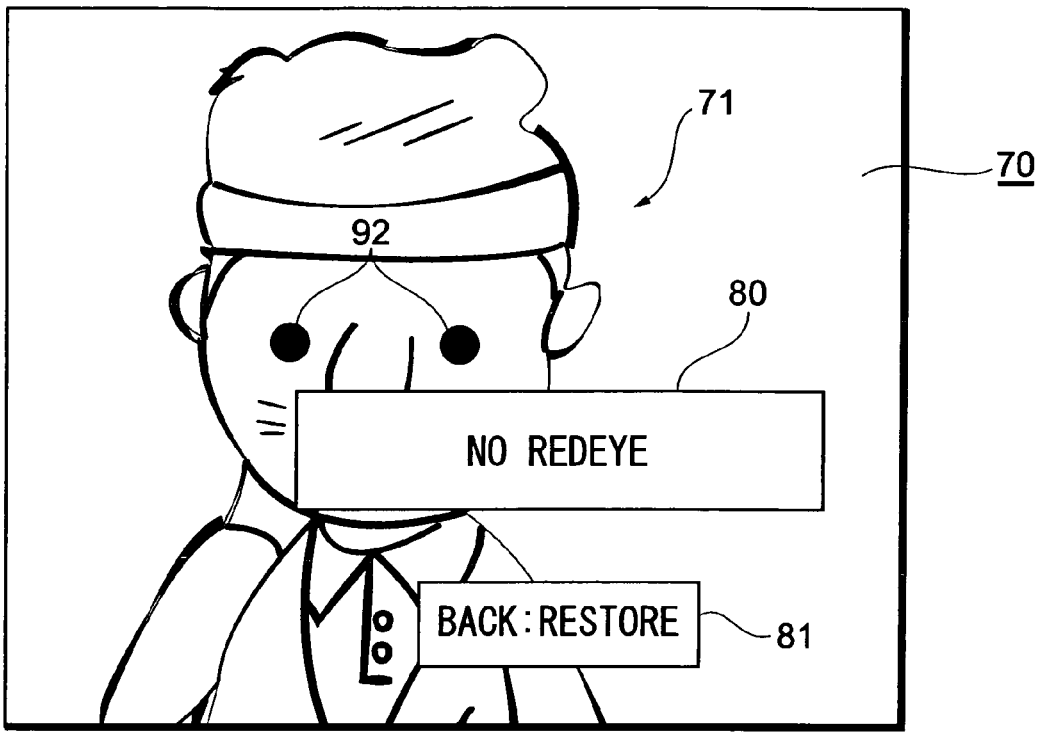

If it is determined by redeye detection processing that a redeye image is not contained in the subject image 71 ("NO" at step 37), text 80 that informs the user of the fact that the subject image 71 does not contain a redeye image appears substantially at the center of the display screen 70, as shown in FIG. 11 (step 38). Further, an operating window 81 indicating that the image shown in FIG. 7 will be restored also appears near the bottom of the display screen 70 in response to depression of the BACK button.

Figure 10:
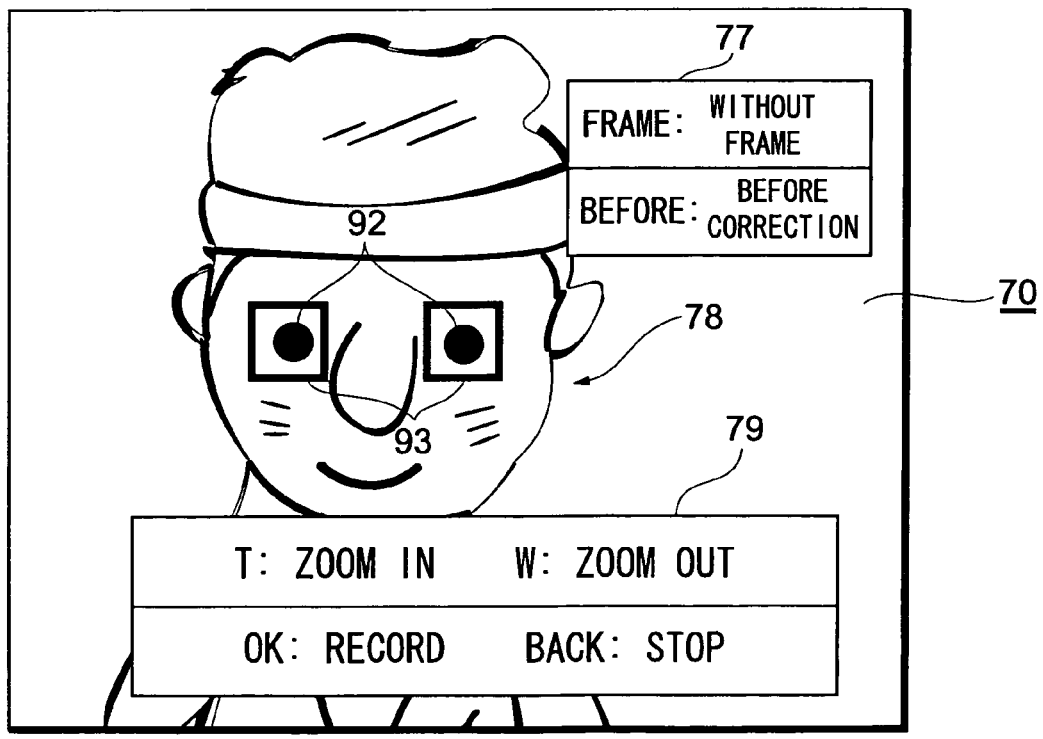

If it is determined by redeye detection processing that the subject image 71 contains a redeye image ("YES" at step 37), then a subject image 78 in which the area of the detected redeye image has been corrected is displayed on the display screen 70, as illustrated in FIG. 10 (step 39).

As shown in FIG. 10, areas 92 that have been corrected for the redeye image are enclosed by frames 93 in such a manner that the user can tell at a glance that the correction has been applied. Since the redeye-corrected areas 92 are enclosed by the frames 93, the user can tell which areas of the subject image 78 have been corrected.

A first operating window 77 is being displayed at the upper right of the display screen 70. Text reading "FRAME: WITHOUT FRAME" and "BEFORE: BEFORE CORRECTION" is being displayed in the first operating window 77. It will be understood by observing the first operating window 77 that the FRAME button should be pressed in a case where the subject image 78 from which the frames 93 have been removed is to be displayed on the display screen 70, and that the BEFORE button should be pressed in order to display the subject image 78 that prevailed prior to the redeye correction on the display screen 70. Furthermore, a second operating window 79 is being displayed near the bottom of the display screen 70. Text reading "T: ZOOM IN W: ZOOM OUT", which indicates zoom operating instructions, and text reading "OK: RECORD BACK: STOP", which indicates instructions regarding an operation for recording the subject image 78 after the redeye correction, is being displayed in the second operating window 79. The subject image 78 is subjected to zoom-in processing by pressing the telephoto button and to zoom-out processing by pressing the wide-angle button. Further, image data representing the subject image 78 that has undergone redeye image processing is recorded on the memory card 11 by pressing the OK button. Processing for recording the image data, which represents the subject image 78 that has undergone redeye image processing, on the memory card 11 is halted by pressing the BACK button.

Figure 3:
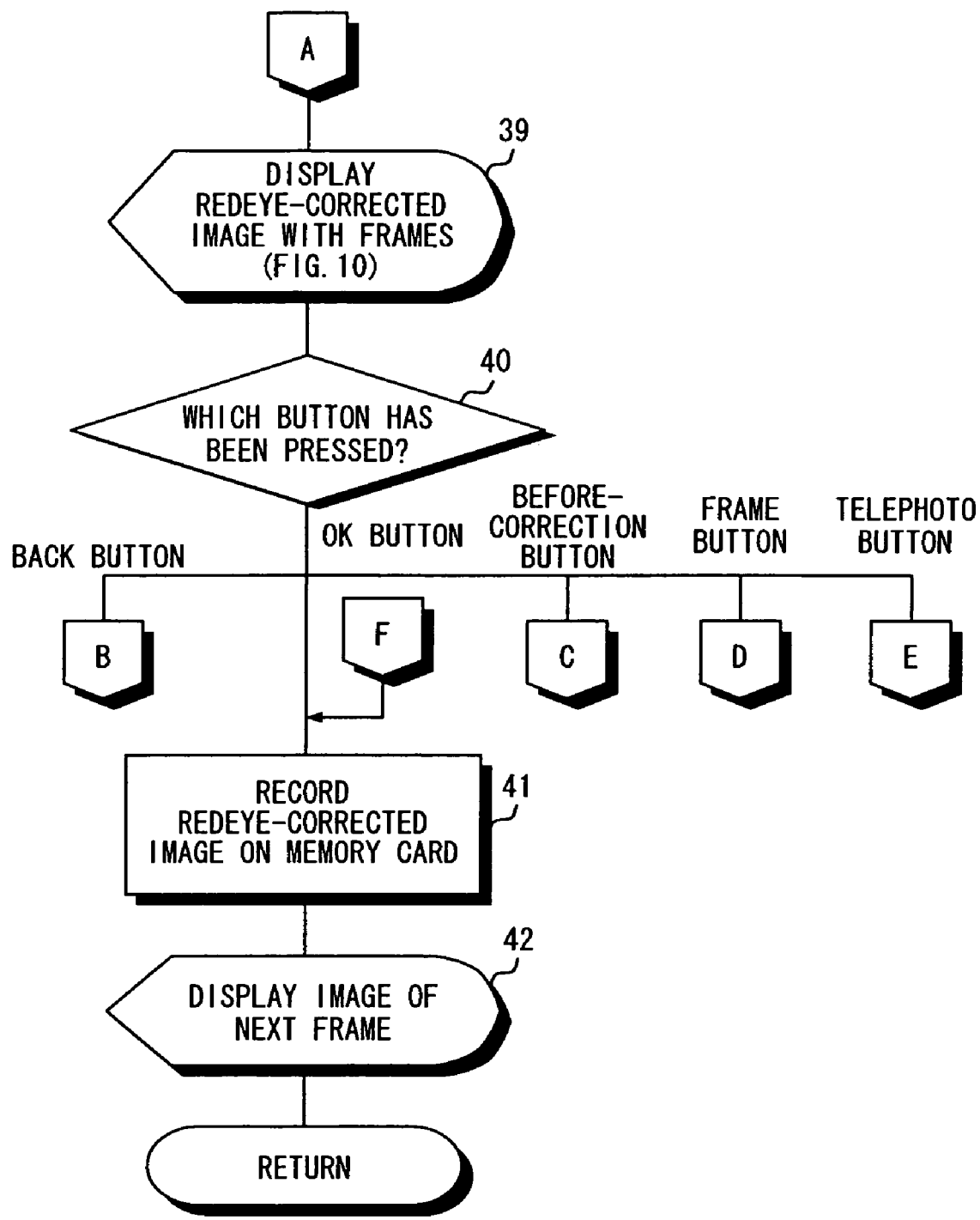
Figure 12:
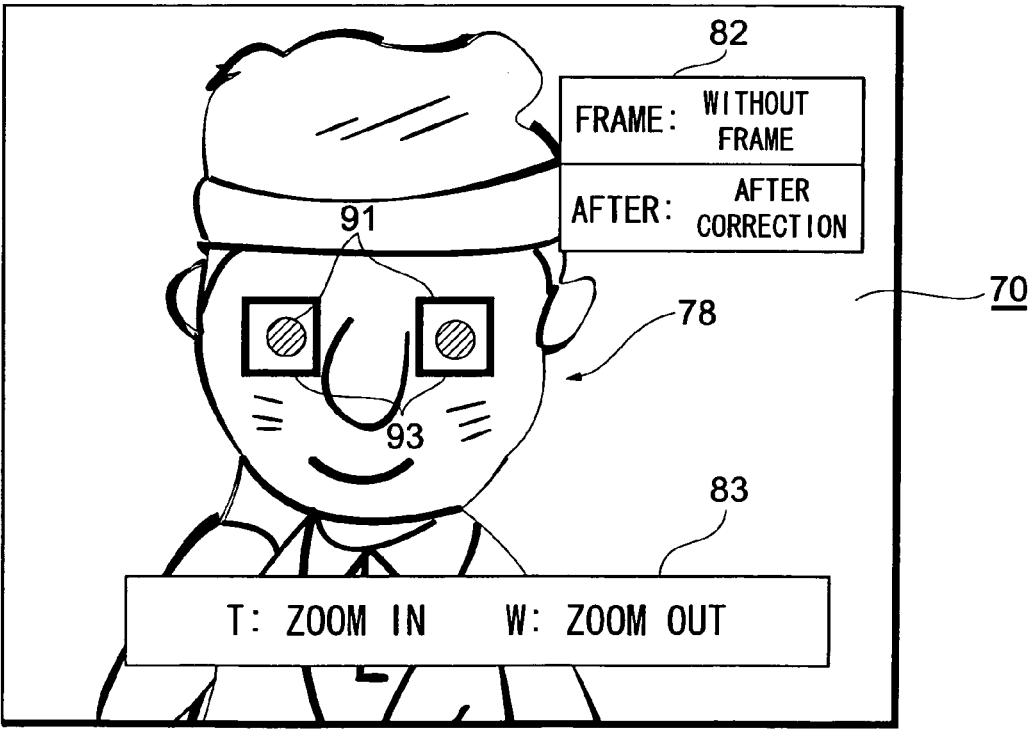
Figure 14:
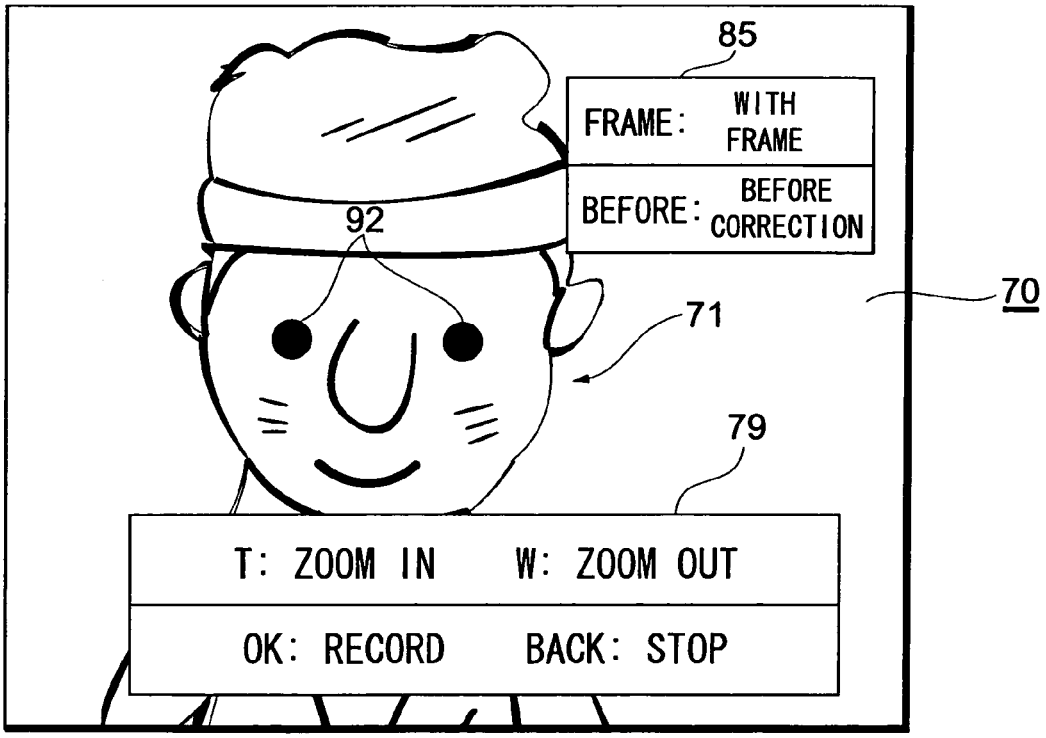
Figure 18:
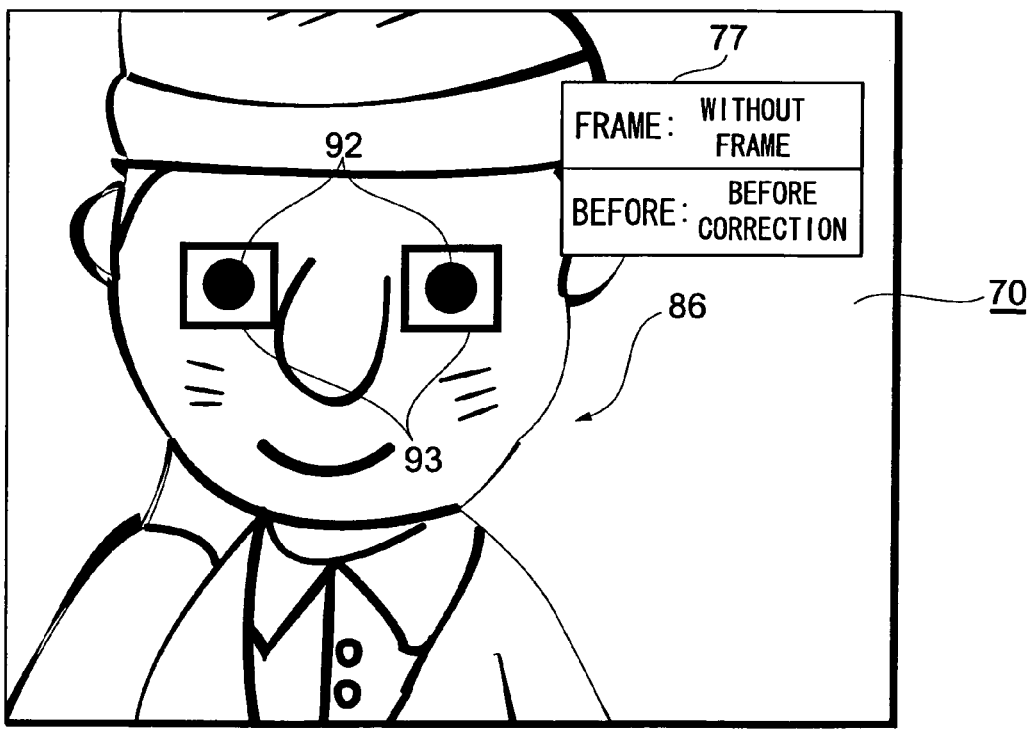

In FIG. 3, with the subject image 78 that has undergone processing for correcting the redeye image being displayed on the display screen 7, it is determined which button has been pressed (step 40). If the BACK button is pressed, there is a halt to processing for recording the image data representing the subject image 78 that has undergone the redeye correction and the subject image 71, which prevailed prior to the redeye correction, is displayed on the display screen 70, as shown in FIG. 7. If the OK button is pressed, the image data representing the subject image 78 after the redeye correction is recorded on the memory card 11 (the image data representing the images of the frames 93 is not recorded). Image data representing the image of the next frame is read out of the memory card 11 and the image of the subject represented by the read image data is displayed on the display screen 70. If the before-correction button is pressed, the subject image 78 prevailing prior to redeye correction of redeye image areas 92 is displayed on the display screen 70 accompanied by the frames 93, as illustrated in FIG. 12 (step 43). If the FRAME button is pressed, the subject image 71 after the redeye correction is displayed on the display screen 70, as illustrated in FIG. 14 (step 47 in FIG. 4). If the telephoto button is pressed, zoom-in processing is executed and the subject image after the redeye correction is displayed on the display screen 70 in enlarged form, as illustrated in FIG. 18 (subject image 86; step 57 in FIG. 5).

Figure 13:
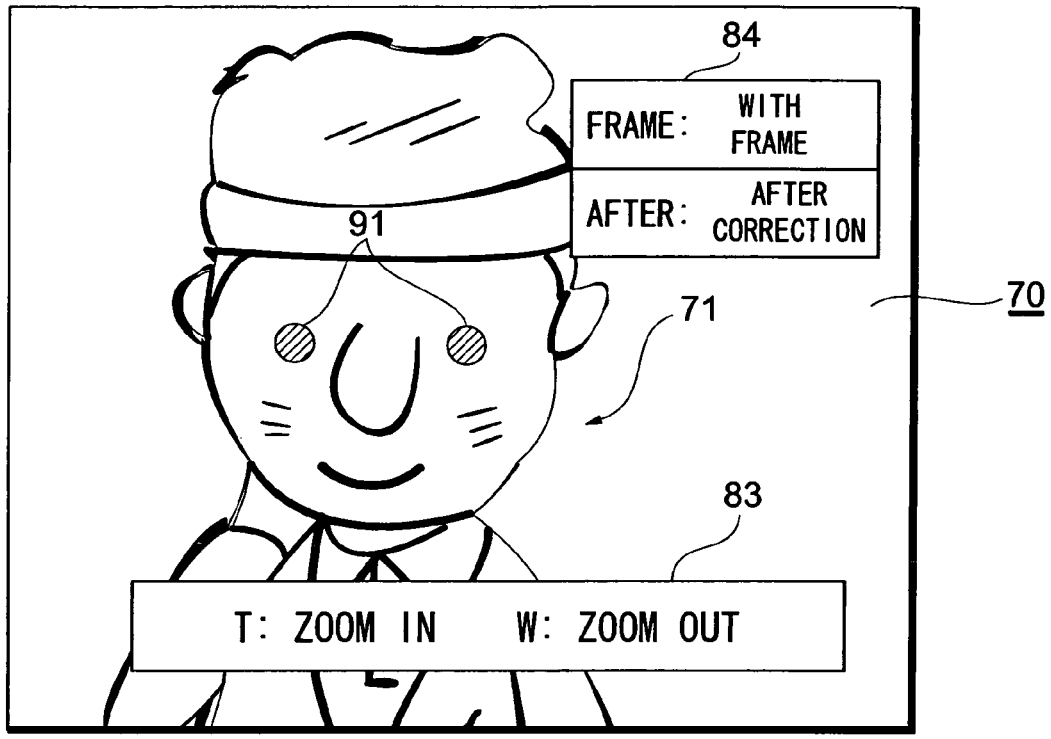

Assume here that the before-correction button has been pressed. When the before-correction button is pressed, the subject image 78 prevailing prior to correction of the redeye image is displayed on the display screen 70 in a state in which the redeye images are enclosed by the frames 93 (step 43 in FIG. 4). A first operating window 82 is being displayed at the upper right of the display screen 70. Text reading "FRAME: WITHOUT FRAME" and "AFTER: AFTER CORRECTION" is being displayed in the first operating window 82. The user can ascertain by observing the characters in the first operating window 82 that the FRAME button should be pressed in a case where the subject image devoid of the frames 9 is to be displayed, and that the AFTER button should be pressed in a case where the subject image after the correction of the redeye images 92 is to be displayed. Further, a second operating window 83 identical with a second operating window 83 illustrated in FIG. 13 is being displayed near the bottom of the display screen 70. Which button has been pressed is determined by the user (step 44).

If the after-correction button has been pressed, then the subject image 78 after the correction of the redeye image is displayed on the display screen 70 accompanied by the frames 93, as illustrated in FIG. 10 (step 39 in FIG. 3).

If the FRAME button has been pressed, then the subject image 71 prevailing prior to correction of the redeye images 91 is displayed on the display screen 70 without the frames, as illustrated in FIG. 13 (step 45 in FIG. 4). A first operating window 84 is being displayed at the upper right of the display screen 70, and the second operating window 83 is being displayed near the bottom of the display screen 70. Text reading "FRAME: WITH FRAME" and "AFTER: AFTER CORRECTION" is being displayed in the first operating window 84. It will be understood by observing the text in the first operating window 84 that the FRAME button should be pressed in a case where frames are to be displayed about the redeye images 91, and that the AFTER button should be pressed in a case where the subject image that has undergone the redeye-image correction is to be displayed.

Figure 15:
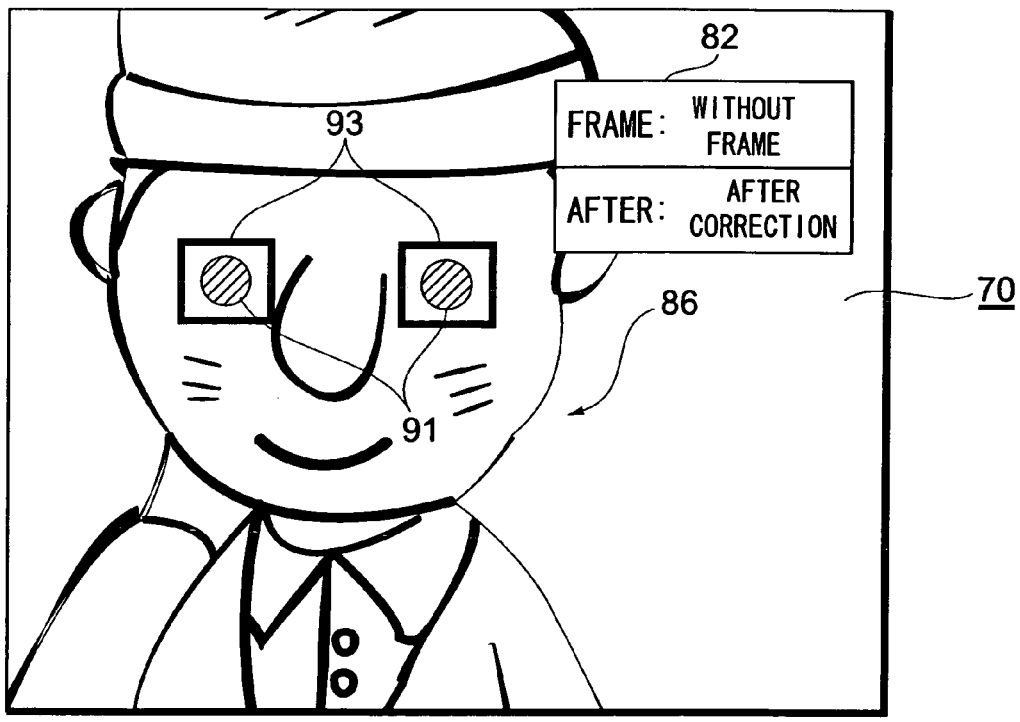

If the telephoto button has been pressed, the subject image 78 being displayed on the display screen 70 is subjected to zoom-in processing (step 48). As shown in FIG. 15, the subject image 86 prior to processing of the redeye images and enlarged by zoom-in is displayed on the display screen 70 accompanied by the frames 93 (step 49). The first operating window 82 is being displayed at the upper right of the display screen 70.

If a button is pressed in a case where the subject image 71 shown in FIG. 13 is being displayed, which button has been pressed is determined (step 46). If the after-correction button is pressed, the subject image 71 having the areas 92 in which the redeye correction has been performed is displayed on the display screen 70 without the frames (step 47), as shown in FIG. 14. A first operating window 85 is displayed at the upper right of the display screen 70, and the second operating window 79 is displayed near the bottom of the display screen 70. Text reading "FRAME: WITH FRAME" and "BEFORE: BEFORE CORRECTION" is displayed in the first operating window 85. The user can ascertain that pressing the FRAME button will cause frames to be displayed about the redeye-image areas 92 that have been corrected and that pressing the BEFORE button will cause the subject image that prevailed before the correction to be displayed on the display screen 70.

If the FRAME button is pressed in a state in which the subject image 71 shown in FIG. 13 is being displayed, then the subject image 78 shown in FIG. 12 is displayed on the display screen 70 (step 43).

If the telephoto button is pressed in a case where the subject image 71 shown in FIG. 13 is being displayed, then zoom-in processing is executed and the enlarged subject image 86 is displayed on the display screen 70, as illustrated in FIG. 15. After zoom-in processing has been executed, the display position can be moved by using a cross-hairs button.

Figure 16:
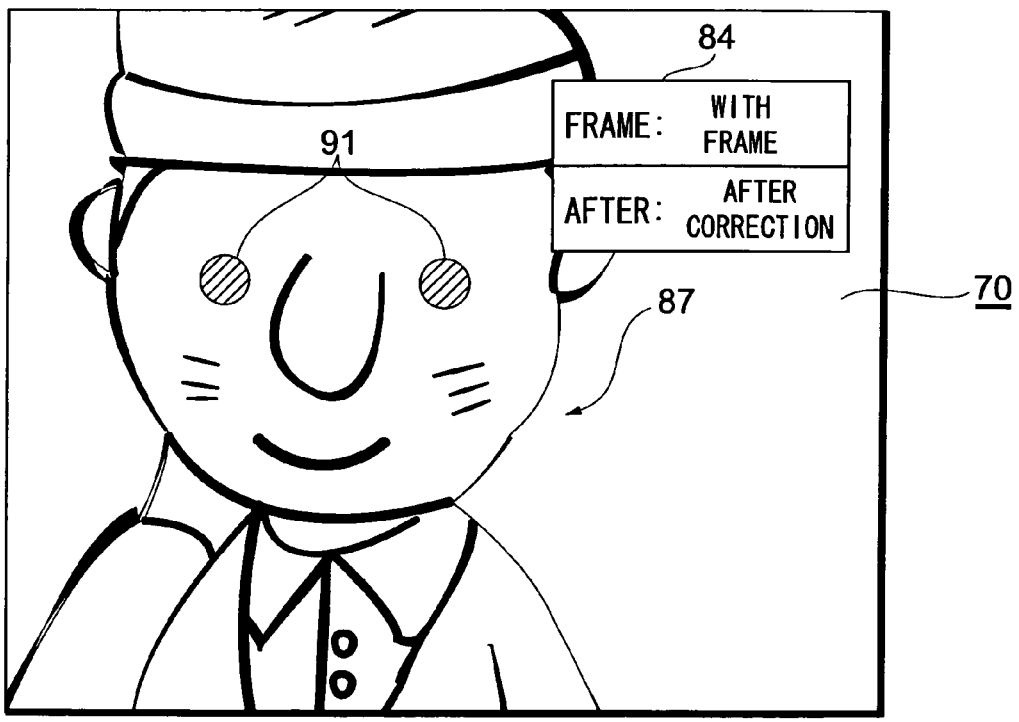

If a button is pressed in a case where the subject image 86 shown in FIG. 15 is being displayed on the display screen 70, then which button has been pressed is checked (step 50). If the FRAME button is pressed, a zoomed-in subject image 87 that prevails after the correction of the redeye images is displayed on the display screen 70, as shown in FIG. 16 (step 51). The first operating window 84 is being displayed at the upper right of the display screen 70.

If the wide-angle button is pressed in a case where the subject image 86 shown in FIG. 15 is being displayed on the display screen 70, then zoom-out processing is executed (step 52) and the subject image shown in FIG. 12 that prevailed prior to the redeye-image correction is displayed together with the frames 93 (step 43).

If a button is pressed in a case where the subject image shown in FIG. 14 that has undergone the redeye-image correction is being displayed without the frames (step 47), which button has been pressed is checked (step 53 in FIG. 5).

Figure 17:
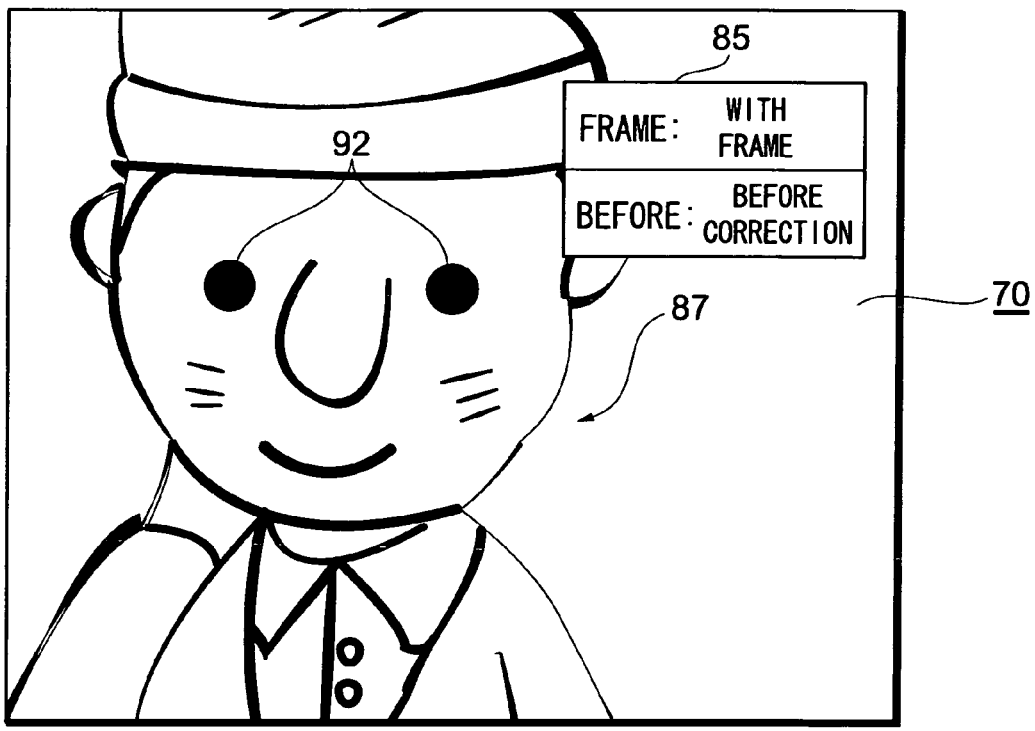

If the before-correction button is pressed, the subject image 71 prior to correction of the redeye images is displayed on the display screen 70, as shown in FIG. 13 (step 45 in FIG. 4). If the telephoto button is pressed, the subject image 71 being displayed on the display screen 70 is subjected to zoom-in processing (step 54) and the subject image 87 that has undergone the zoom-in processing and the redeye-image correction is displayed on the display screen 70 without the frames (step 55), as shown in FIG. 17. The first operating window 85 is displayed at the upper right of the display screen 70. If the FRAME button is pressed, the subject image 78 after the redeye-image correction is displayed on the display screen 70, as shown in FIG. 10. If the BACK button is pressed, the subject image 71 represented by image data that has been read out of the memory card 11 is displayed on the display screen 70, as shown in FIG. 7. If the OK button is pressed, image data representing the redeye-corrected subject image 71 being displayed on the display screen 70 is recorded on the memory card 11 (step 41).

If a button is pressed in a case where the subject image 87 shown in FIG. 17 is being displayed, which button has been pressed is determined (step 56). If the FRAME button is pressed, the subject image 86, in which the image areas 92 that have undergone the redeye-image correction are enclosed by the frames 93, is displayed on the display screen 70, as shown in FIG. 18 (step 57). The first operating window 77 is being displayed at the upper right of the display screen 70. If the before-correction button is pressed in a case where the subject image 87 shown in FIG. 17 is being displayed, the subject image that has undergone the zoom-in processing and the redeye-image correction is displayed on the display screen 70 without the frames (step 51 in FIG. 4).

If a button is pressed in a case where the subject image 86 shown in FIG. 18 is being displayed, which button has been pressed is determined (step 58). If the FRAME button is pressed, the subject image 87 that prevails after the correction of the redeye images is displayed without the frames, as shown in FIG. 17 (step 55). If the wide-angle button is pressed in a case where the subject image 86 shown in FIG. 18 is being displayed, then zoom-out processing is executed and the subject image 78 after the redeye-image correction is displayed on the display screen 70 together with the frames 93 (step 39 in FIG. 3).

If a button is pressed in a case where the subject image 87 shown in FIG. 16 is being displayed, which button has been pressed is checked (step 59 in FIG. 5). If the FRAME button is pressed, the subject image 86 that prevailed prior to the redeye correction is displayed on the display screen 70 accompanied by the frames 93 (step 49 in FIG. 4), as illustrated in FIG. 15. If the wide-angle button has been pressed, then zoom-out processing is executed and the subject image 71 that prevailed prior to the redeye correction is displayed on the display screen 70, as shown in FIG. 13. If the after-correction button has been pressed, then the subject image prevailing after the correction of the redeye images is displayed on the display screen 70 without the frames (step 55 in FIG. 5), as illustrated in FIG. 17.

Thus, even if a redeye image has been corrected, the location of the correction is indicated explicitly and therefore the user can check which area has been corrected. Further, if necessary, the image of a subject prevailing prior to the redeye-image correction can be displayed with or without frames. This makes it possible for the user to check the conditions prior to the correction.

The embodiment set forth above has been described with regard to processing for correcting a redeye image. However, it goes without saying that the invention is not limited solely to correction of a redeye image but can also be utilized in other correction processing by explicitly indicating image areas that have undergone a correction in a case where correction processing has been executed. Further, although a corrected area is enclosed by a frame in the above embodiment, a corrected area may be explicitly indicated not only by enclosure in a frame but also by being indicated by an arrow, by a change in tone, by a change in brightness or by a flashing display, etc. Furthermore, with regard to areas that are not corrected rather than areas that have been corrected, the corrected areas may be explicitly indicated by a change in tone, a change in brightness, a change in saturation and a change in hue or by a complementary-color display, color-fill display or flashing display.

FIGS. 19 to 25 illustrate another embodiment of the present invention.

Figure 19:
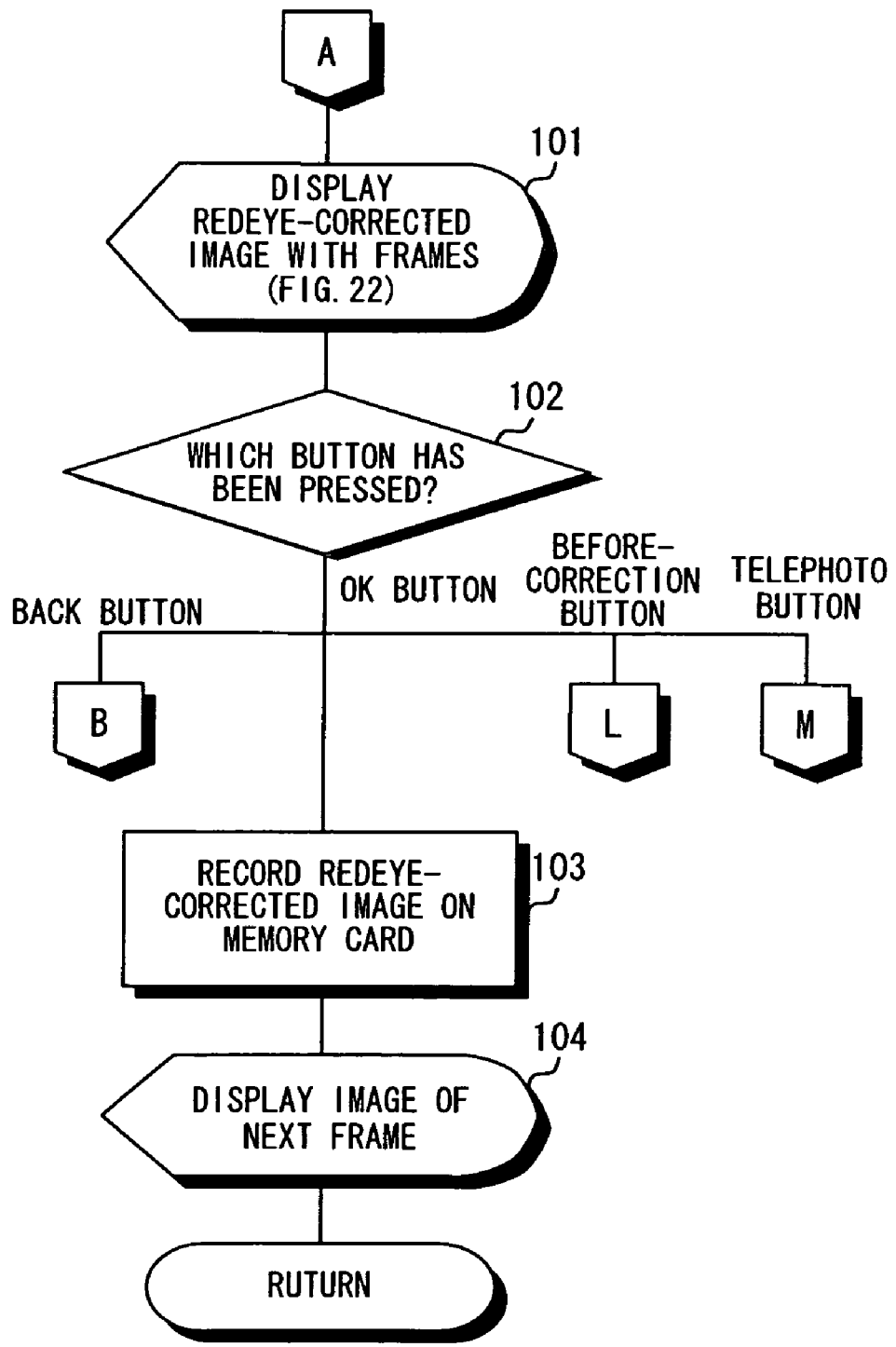
FIGS. 19 and 20 are flowcharts illustrating processing executed by a digital still camera.
Figure 20:
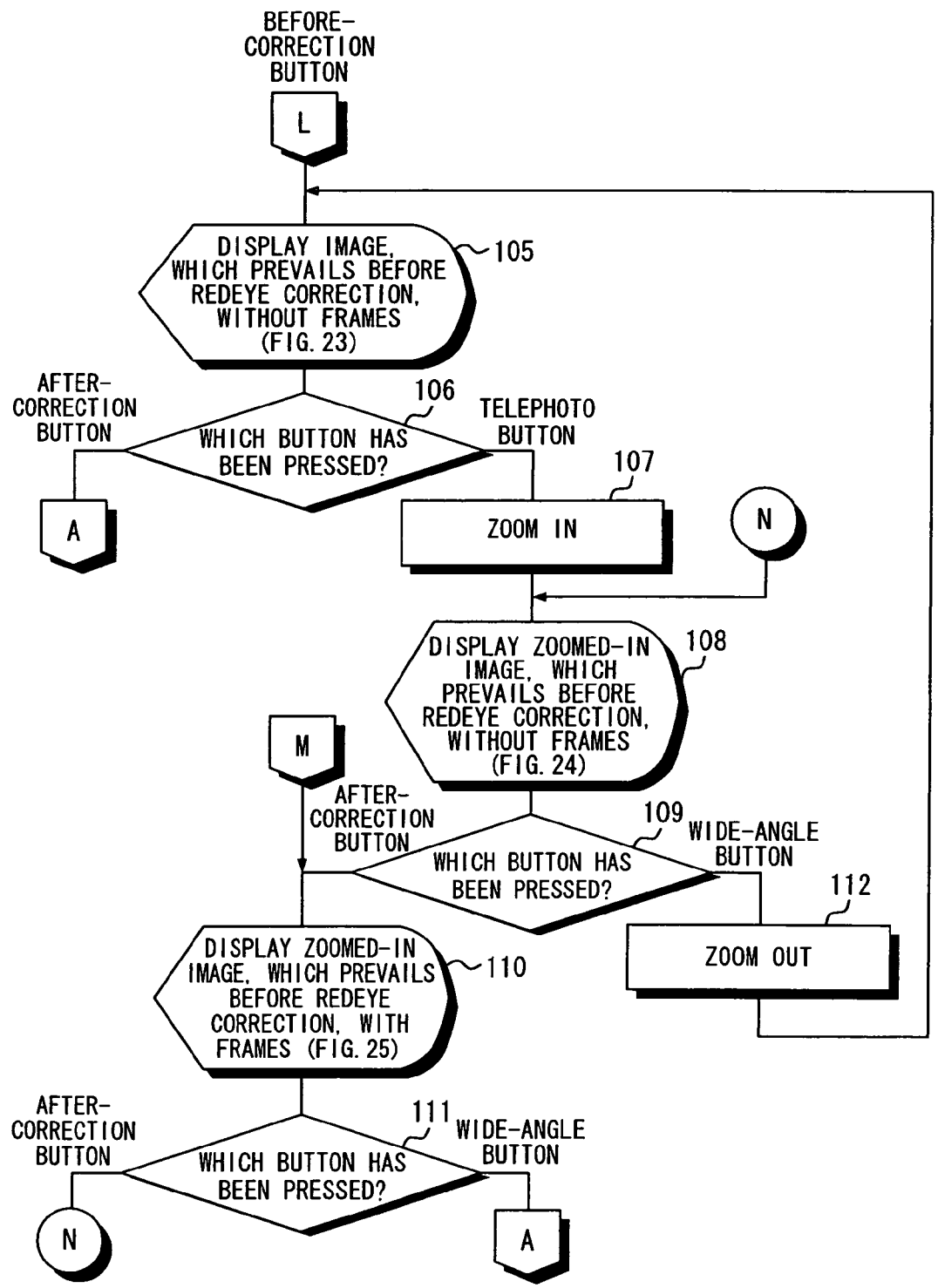
Figure 21:
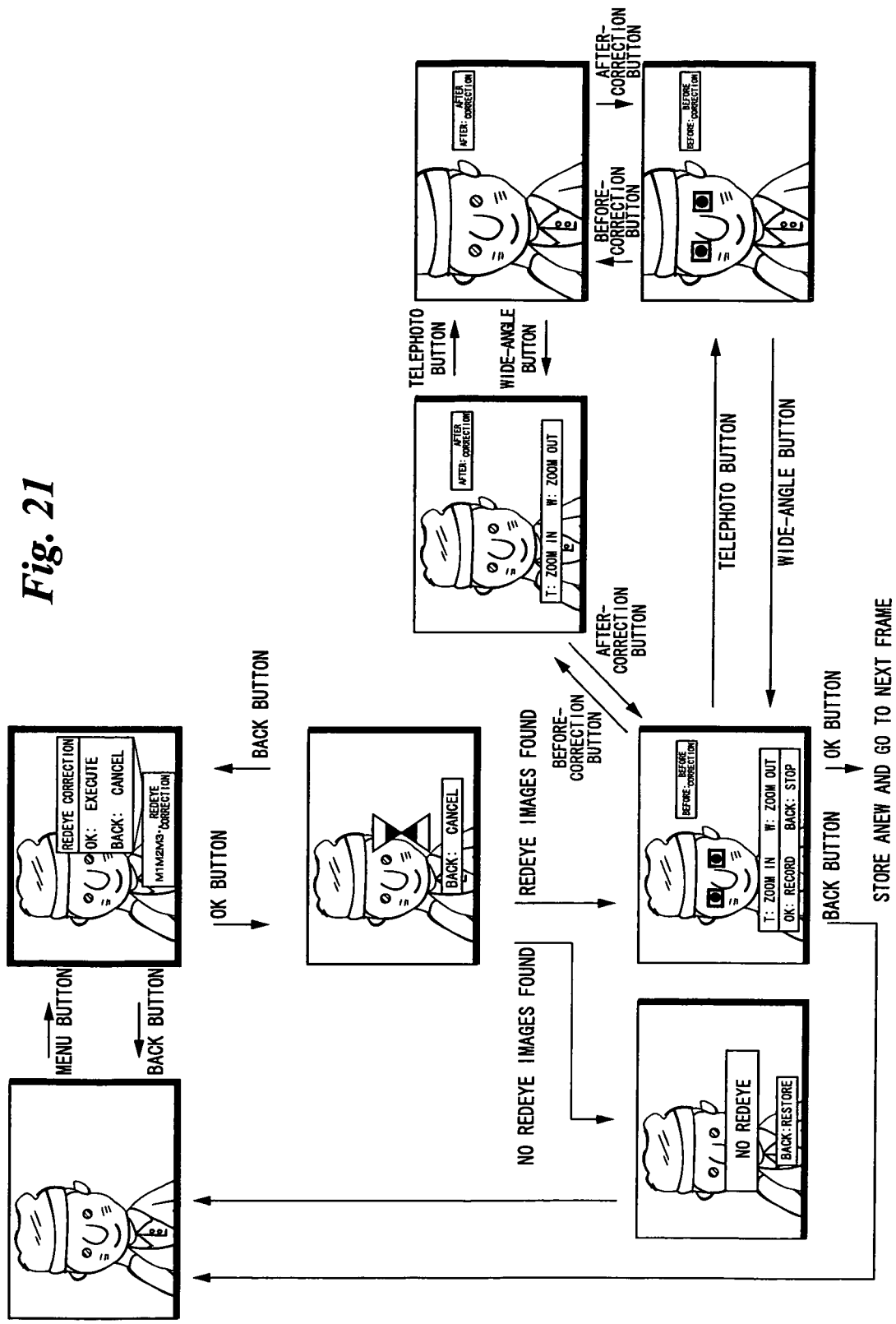
FIG. 21 illustrates the transition of the image of a subject displayed on a display screen.

FIGS. 19 and 20 are flowcharts illustrating processing executed by a digital still camera, FIG. 21 illustrates the transition of the image of a subject displayed on the digital still camera, and FIGS. 22 to 25 illustrate examples of images of a subject displayed on the digital still camera.

In the embodiment described above, it is possible to enclose by the frames 93 not only image areas that have undergone the redeye-image correction but also image areas prior to the redeye-image correction. In the embodiment set forth below, however, an enclosing frame is not displayed around a redeye-image area that prevails prior to a redeye correction but is displayed around a redeye-image area that has undergone a redeye correction.

Image data is read out of the memory card 11, the image of the subject represented by the read image data is displayed in the manner shown in FIG. 7, and then the image of the subject is displayed in the manner shown in FIGS. 8 and 9. This processing is similar to that of the above-described embodiment.

Figure 22:
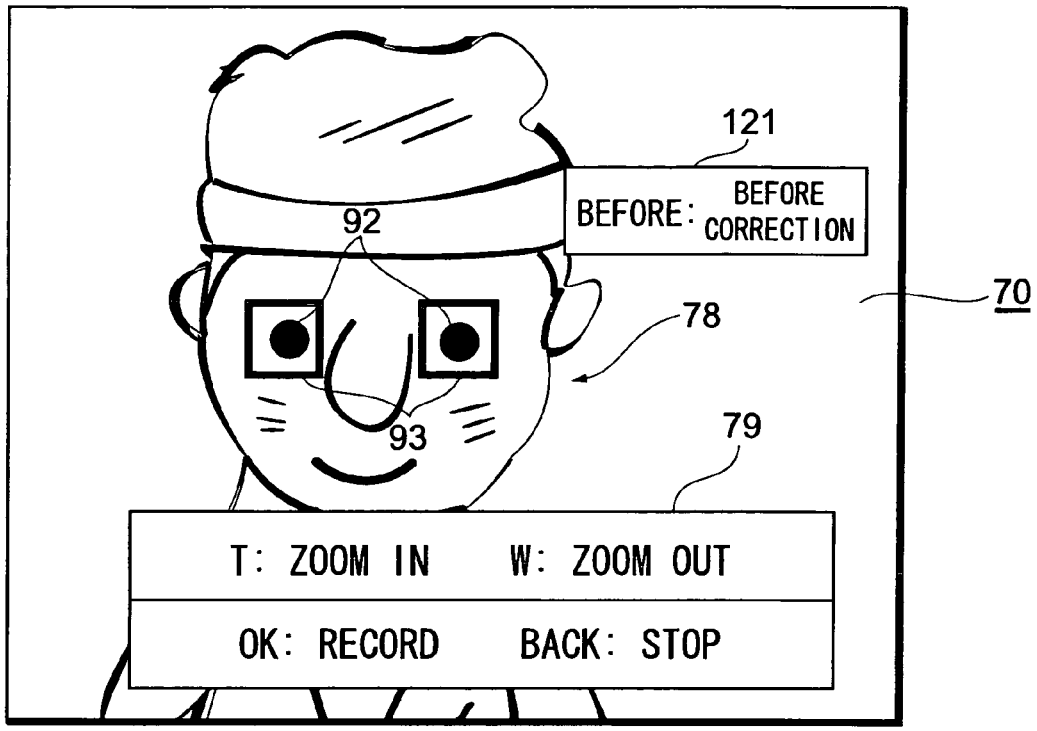
FIGS. 22 to 27 illustrate examples of images of a subject displayed on a display screen.

In a case where redeye-image detection processing is executed and a redeye image is contained in the image of the subject, redeye-image correction processing is executed and, as illustrated in FIG. 22, the subject image 78 that has undergone the redeye-image correction is displayed on the display screen 70 with the frames 93 enclosing the corrected redeye-image areas 92 (step 101). A first operating window 121 is being displayed at the upper right of the display screen 70, and the second operating window 79 is being displayed near the bottom of the display screen 70. Text reading "BEFORE BUTTON: BEFORE CORRECTION" is being displayed in the first operating window 121. The user can ascertain by observing this text that the subject image prevailing prior to the redeye-image correction can be displayed on the display screen 70 by pressing the BEFORE button.

If a button is pressed in a state in which the subject image 78 shown in FIG. 22 is being displayed, which button has been pressed is checked (step 102).

If the BACK button has been pressed, then processing for recording the image data representing the subject image that has undergone the redeye-image correction is cancelled and the subject image represented by the image data that has been read out of the memory card 11 is displayed on the display screen 70.

If the OK button has been pressed, the image data representing the subject image 78 after the redeye-image correction is recorded on the memory card 11 (step 103) and the image of the next frame is displayed on the display screen 70.

Figure 23:
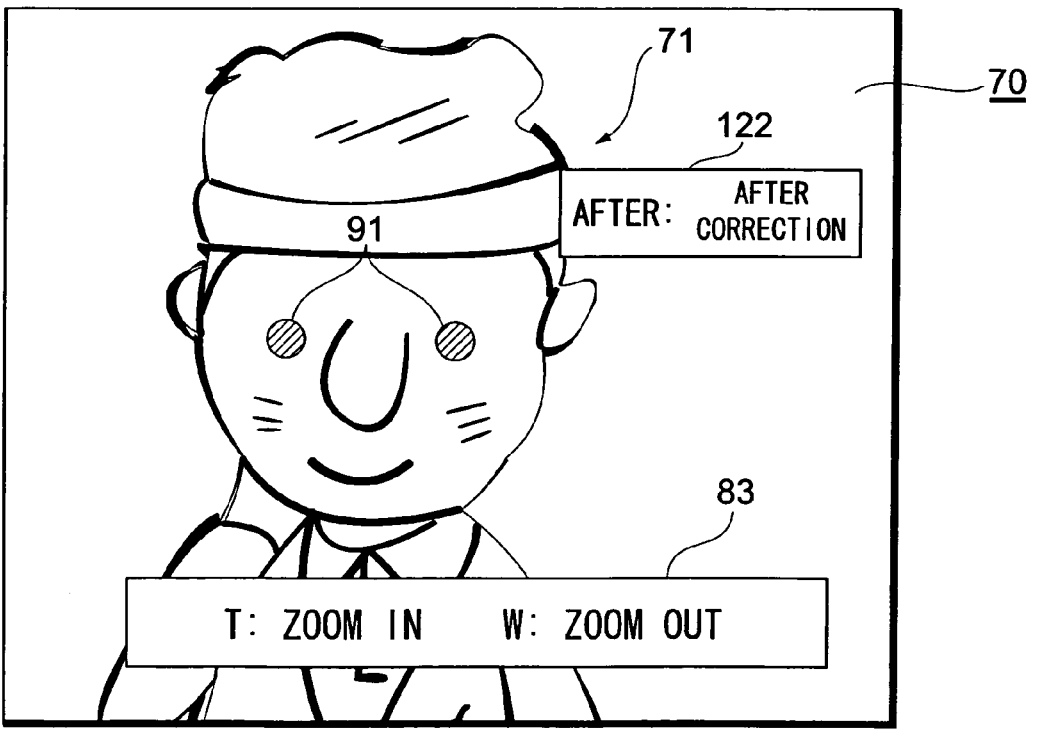

If the before-correction button has been pressed, the subject image 71 prevailing prior to correction of redeye images 91 is displayed on the display screen 70 accompanied by the frames 93, as illustrated in FIG. 23 (step 105). The frames 93 that were being displayed in a case where the redeye images were corrected vanish from around the redeye images 91. A first operating window 122 is being displayed at the upper right of the display screen 70, and the second operating window 83 is being displayed near the bottom of the display screen 70. Text reading "AFTER: AFTER CORRECTION" is being displayed in the first operating window 122. The user can ascertain by observing the first operating window 122 that the subject image 78 in which the redeye-image areas 91 have been corrected can be displayed on the display screen 70 by pressing the AFTER button.

Figure 25:
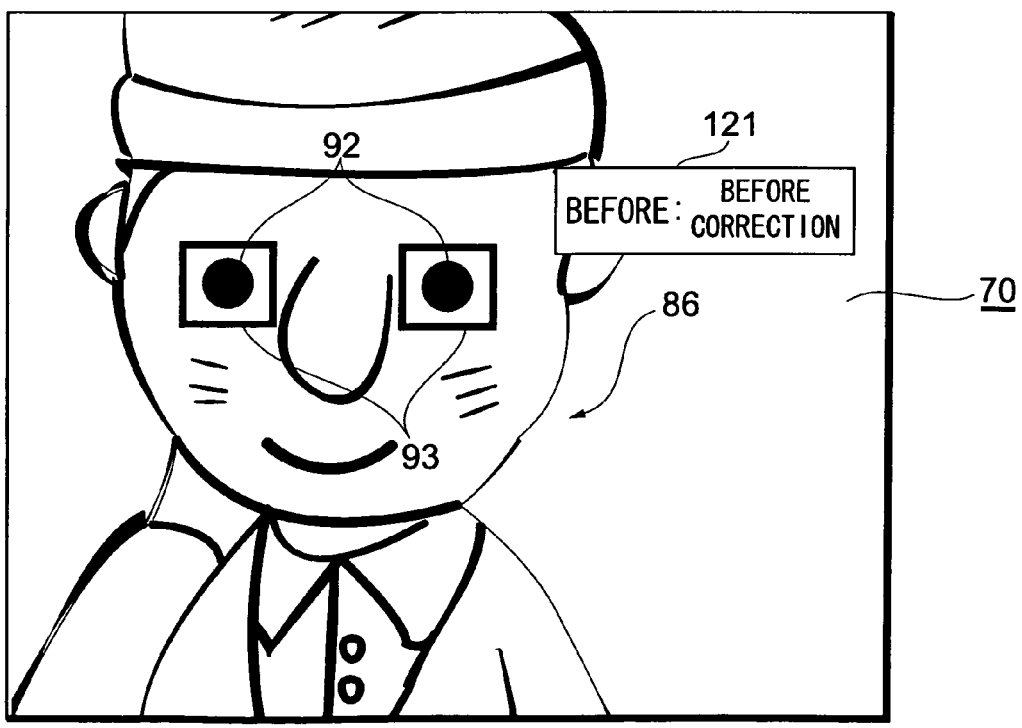

If the telephoto button has been pressed, the subject image 86, which includes the image areas 92 that have been corrected for redeye images and in which the image areas 92 are enclosed by the frames 93, is displayed on the display screen 70, as shown in FIG. 25 (step 110). The first operating window 121 is being displayed at the upper right of the display screen 70.

If a button is pressed in a case where the subject image 71 that prevails before correction of the redeye-image areas 91 is being displayed on the display screen 70, as shown in FIG. 23, which button has been pressed is determined (step 106).

If the after-correction button is pressed, then the subject image 78 that includes the image areas 92 that have undergone the redeye-image correction is displayed again on the display screen 70 together with the frames 93 (step 101).

Figure 24:
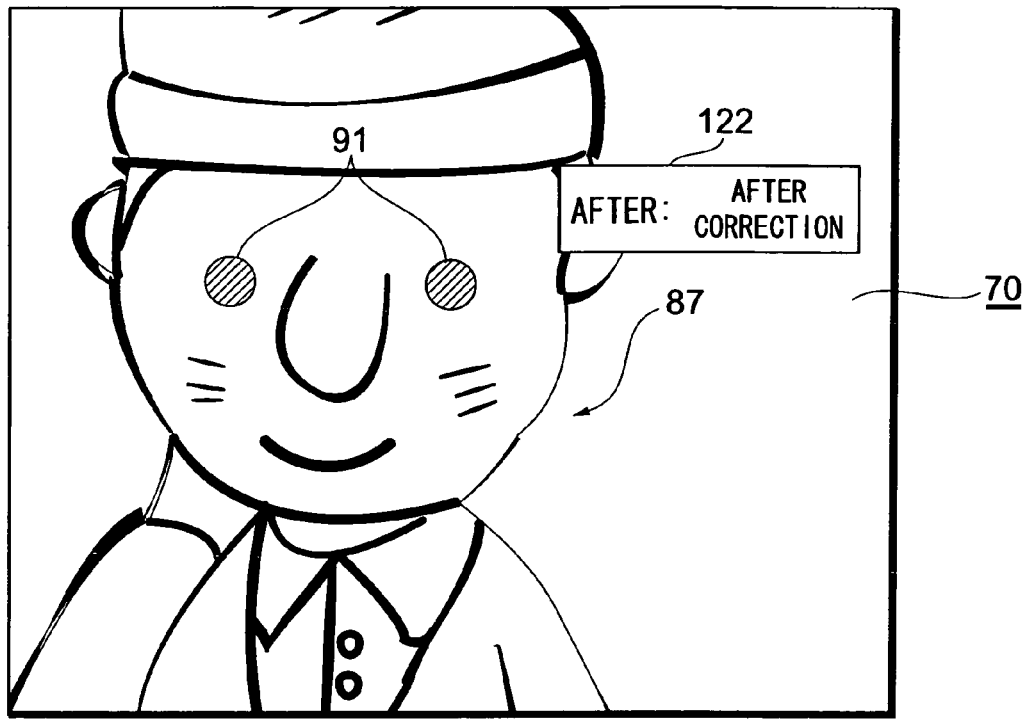

If the telephoto button is pressed, zoom-in processing is executed (step 107) and the subject image prior to the correction of the redeye-image areas 91 is displayed on the display screen 70 in enlarged form, as illustrated in FIG. 24 (step 108). Since the image is as it appears before the correction of the redeye images 91, frames are not displayed around the redeye images 91.

If a button is pressed in a case where the subject image 87 shown in FIG. 24 is being displayed, which button has been pressed is determined (step 109).

If the after-correction button has been pressed (step 109), the subject image 86 in which the redeye-image corrected image areas 92 are enclosed by the frames 93 is displayed on the display screen 70 in enlarged form, as illustrated in FIG. 25 (step 110). Further, if the before-correction button is pressed in a case where the subject image 86 shown in FIG. 25 is being displayed (step 111), the subject image 87 prevailing prior to the correction of the redeye images 92 is displayed again on the display screen 70, as illustrated in FIG. 24 (step 108). If the wide-angle button is pressed, then zoom-out processing is executed and the subject image 78, which has been zoomed out and has the redeye-image corrected image areas 92 enclosed by the frames 93, is displayed on the display screen 70, as illustrated in FIG. 22 (step 101).

If the wide-angle button has been pressed in a state where the subject image 87 shown in FIG. 24 is being displayed, then zoom-out processing is executed (step 112) and the subject image 71 in which the redeye images 91 have not been corrected is displayed on the display screen 70, as illustrated in FIG. 23 (step 105). Since the redeye images 91 have not been corrected, the frames are not displayed around them.

Thus, it may be so arranged that if a redeye image has been corrected, an enclosing frame is displayed so that the corrected area may be ascertained, and if a redeye image has not been corrected, no frame is displayed.

Figure 26:
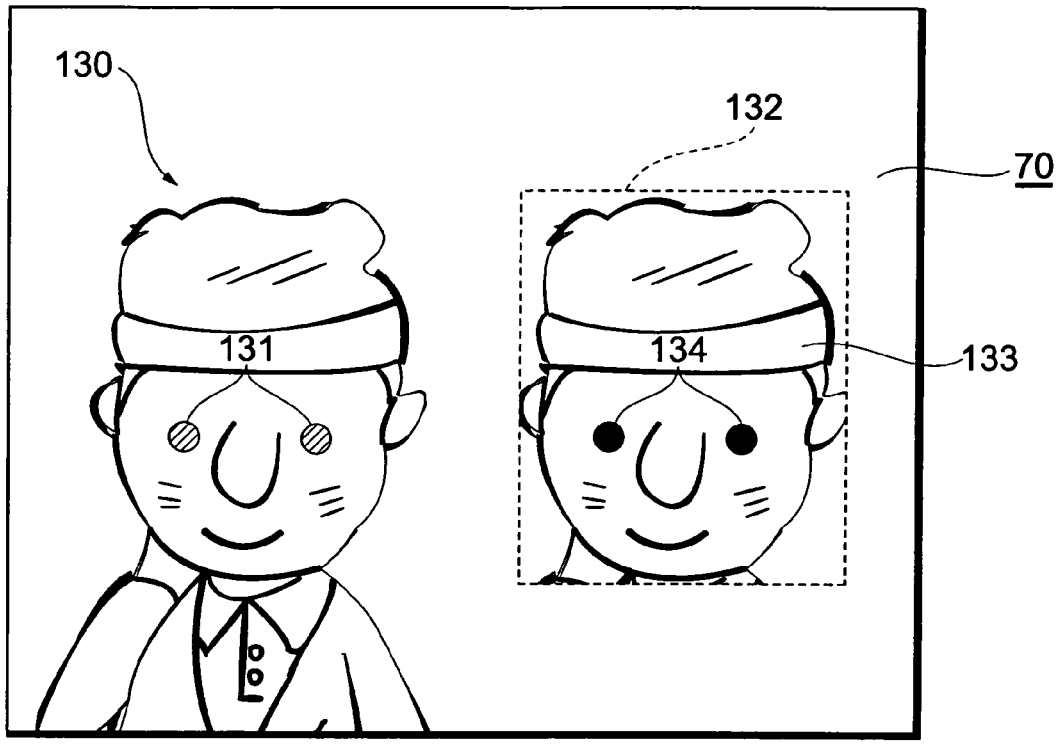

FIG. 26 illustrates another embodiment of the present invention and shows an example of the image of a subject displayed on the display screen 70.

In the embodiments set forth above, a subject image in which redeye images have been corrected and a subject image prior to correction of redeye images are not displayed on the same screen simultaneously. In the embodiment that follows, however, a subject image in which redeye images have been corrected and a subject image prior to correction of redeye images can be displayed on the same screen simultaneously.

A corrected-image display area 132 is defined at the upper right of the display screen 70 of display unit 15. The entirety of a subject image 130 prior to correction of redeye images 131 is being displayed on the display screen 70 with the exception of the portion corresponding to the corrected-image display area 132.

An image 133 that is one part of the subject image that includes image areas 134 in which redeye images have been corrected is being displayed in the corrected-image display area 132. This image that is part of the subject image can be considered as being centered substantially on the redeye images 131 obtained by processing for detecting the redeye images 131, and includes the portion of the image surrounding the redeye images.

Since the subject image 130 prior to correction of the redeye images 131 and areas 134 after correction of the redeye images 131 can be displayed on the display screen 70 simultaneously, it is easy to compare the conditions before and after the correction of the redeye images.

It goes without saying that in order to generate the corrected-image display area 132 on the display screen 70, it will suffice to utilize image synthesizing processing that is capable of being executed in the digital signal processing circuit 6 of the digital still camera.

Figure 27:
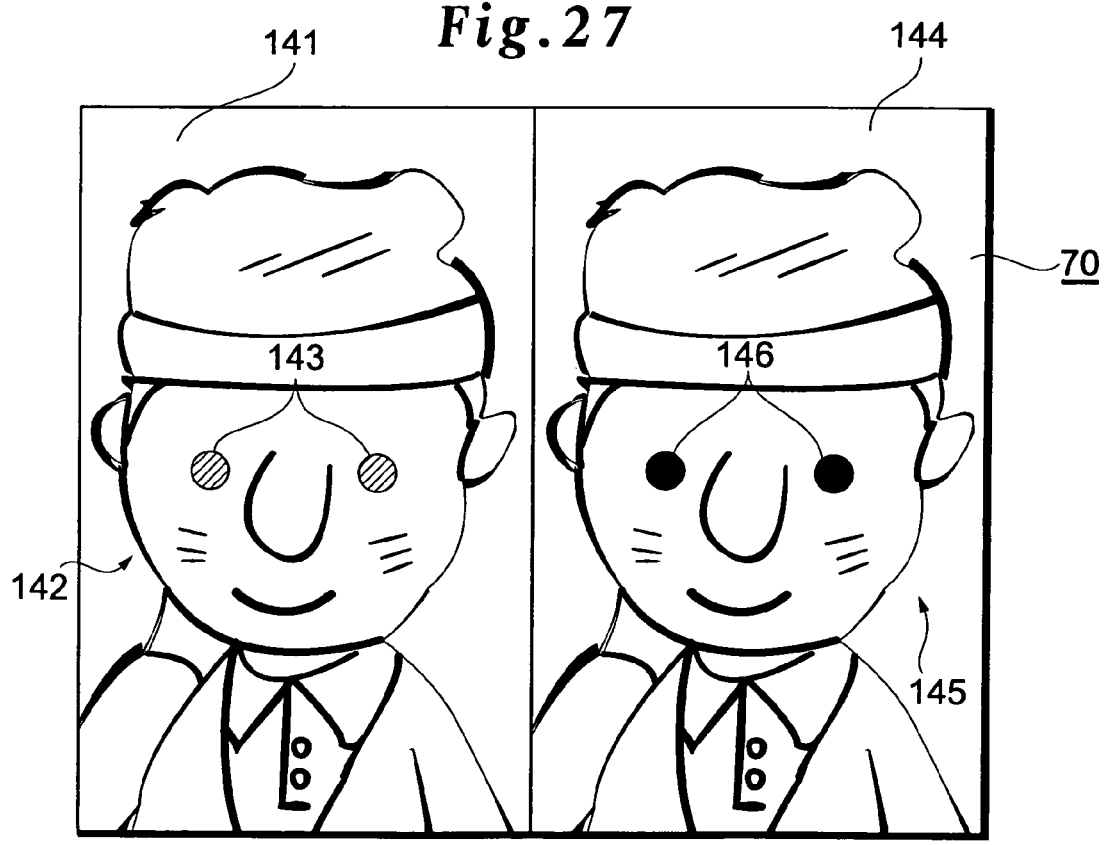

FIG. 27 illustrates another embodiment of the present invention and shows an example of the image of a subject displayed on the display screen 70.

The display screen 70 is divided into right and left portions of approximately the same size, namely a first display area 141 and a second display area 144, respectively.

A subject image 142 before correction of redeye images 143 is being displayed in the first display area 141, and a subject image 145 having image areas 146 that have undergone the redeye-image correction is being displayed in the second image data combining circuit 142.

With this arrangement also the subject images 142 and 143 before and after correction of the redeye images can be displayed on the same display screen 70 simultaneously, and the subject images 142 and 143 before and after correction of the redeye images can be compared directly.

This display method also can be implemented by utilizing image synthesizing processing in the digital signal processing circuit 6 of the digital still camera.

As many apparently widely different embodiments of the present invention can be made without departing from the spirit and scope thereof, it is to be understood that the invention is not limited to the specific embodiments thereof except as defined in the appended claims.

What is claimed is:

1. An image correction apparatus comprising:
 a correction target area detection device for detecting, while operating in a correction mode, a correction target area in the image of a subject;
 a correction device for applying, while operating in the correction mode, at least one correction of a color correction and brightness correction to the correction target area detected by said correction target area detection device; and
 a first display control device for controlling, while operating in the correction mode, a display device in such a manner that the image of the subject, in which the correction target area has been corrected by said correction device, will be displayed on a display screen with the corrected area pointed out explicitly, wherein the first display control device controls the display to toggle back and forth between a display with the corrected area pointed out explicitly and the corrected area without the corrected area pointed out explicitly, while operating in the correction mode and without exiting the correction mode.

2. The apparatus according to claim 1, wherein the correction target area is a redeye area.

3. The apparatus according to claim 1, wherein said first display control device controls the display device in such a manner that the corrected area is pointed out explicitly and displayed on the display screen by at least one of marking and flashing that indicate the correction target area.

4. The apparatus according to claim 1, wherein said first display control device controls the display device in such a manner that the corrected area is pointed out explicitly and displayed on the display screen by at least one of a color correction, brightness correction, marking and flashing of non-correction target areas, which are areas other than the correction target area.

5. The apparatus according to claim 1, further comprising:
 a first input device for inputting a pre-correction display command; and
 a second display control device for controlling the display device, in response to input of the pre-correction command from said first input device, in such a manner that the image of a subject that prevails prior to correction of the correction target area will be displayed on the display screen.

6. The apparatus according to claim 1, further comprising a second input device for inputting an explicit-display halt command;
   wherein said first display control device halts the explicit display in response to the halt command that has been input from said second input device.

7. The apparatus according to claim 6, further comprising:
   a third display control device for controlling the display device in such a manner that the image of the subject, in which the corrected correction target area is restored to the correction target area in a form existing before the correction was applied by said correction device, will be displayed on the display screen in response to the inputting of the explicit-display halt command from said second input device.

8. The apparatus according to claim 6, further comprising:
   an angle of view changing command input device for inputting an angle of view changing command;
   wherein said first display control device controls the display device in such a manner that an angle of view of the image of the subject, in which the correction target area has been corrected, is changed in response to an input of the angle of view changing command from said angle of view changing command input device,
      wherein the image of the subject which is changed in the angle of view is displayed on the display screen, and
      wherein the halting of the explicit display of the image of the subject which is changed in the angle of view is halted in response to the inputting of the halt command from said second input device.

9. The apparatus according to claim 6, further comprising:
   a re-display command input device for inputting a re-display command for the explicit display, wherein said first display control device cancels the halting of the explicit display, and the image of the subject in which the correction target area has been corrected by said correction device will be displayed on the display screen with the corrected area pointed out explicitly.

10. The apparatus according to claim 1, further comprising:
    a device for further correcting the corrected correction target area or restoring the image in a form existing before the correction was applied.

11. The apparatus according to claim 1, further comprising:
    a notifying device for notifying a detection-in-progress of the correction target area by said correction target area detection device or a correction processing-in-progress of the correction target area by said correction device.

12. The apparatus according to claim 1, further comprising:
    a cancel command input device for inputting a cancel command; and
    a cancel device for canceling the correction processing of the correction target area by said correction device in response to the inputting of the cancel command from said cancel command input device.

13. The apparatus according to claim 1, further comprising:
    a second display control device for controlling the display device in such a manner that the image of the subject, in which the corrected correction target area is restored to the correction target area in a form existing before the correction was applied by said correction device, will be displayed on the display screen.

14. The apparatus according to claim 1, wherein said first control device controls the display device in such a manner that the image of the subject before the correction will be displayed on a first display area of the display screen, and the image of the subject in which the correction target area has been corrected by said correction device will be displayed on a second display area of the display screen with the corrected area pointed out explicitly.

15. A method of controlling an image correction apparatus, comprising the steps of:
    detecting, while operating in a correction mode, a correction target area in the image of a subject;
    applying, while operating in the correction mode, at least one correction of a color correction and brightness correction to the detected correction target area; and
    controlling, while operating in the correction mode, a display device in such a manner that the image of the subject, in which the correction target area has been corrected, will be displayed on a display screen with the corrected area pointed out explicitly, wherein the display device is controlled to toggle back and forth between a display with the corrected area pointed out explicitly and the corrected area without the corrected area pointed out explicitly, while operating in the correction mode and without exiting the correction mode.

16. The method of claim 15, further comprising:
    inputting an explicit-display halt command; and
    halting the explicit display in response to the halt command that has been input while the image of the subject, in which the correction target area pointed out explicitly continues to be displayed.

* * * * *